(12) United States Patent
Seo et al.

(10) Patent No.: US 10,291,376 B2
(45) Date of Patent: *May 14, 2019

(54) METHOD AND AN APPARATUS FOR PROVIDING CHANNEL QUALITY INFORMATION IN A WIRELESS COMMUNICATION SYSTEM

(71) Applicant: LG ELECTRONICS INC., Seoul (KR)

(72) Inventors: In Kwon Seo, Anyang-si (KR); Dae Won Lee, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,585

(22) Filed: Jul. 10, 2017

(65) Prior Publication Data

US 2017/0310443 A1 Oct. 26, 2017

Related U.S. Application Data

(63) Continuation of application No. 15/048,569, filed on Feb. 19, 2016, now Pat. No. 9,722,749, which is a (Continued)

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0413* (2013.01); *H04B 7/0626* (2013.01);
(Continued)

(58) Field of Classification Search
None
See application file for complete search history.

(56) References Cited

U.S. PATENT DOCUMENTS 8,265,053 B2  9/2012  Chen et al.
8,724,472 B2  5/2014  Huang et al.
(Continued)

FOREIGN PATENT DOCUMENTS

CN  101379753 A  3/2009
CN  101383683 A  3/2009
(Continued)

OTHER PUBLICATIONS

Ericsson et al., "Type 1 Backhaul Link," 3GPP TSG-RAN WG1 #57-bis, R1-092969, Jun. 29-Jul. 3, 2009, Los Angeles, California, 1 page.
(Continued)

*Primary Examiner* — Anh Vu H Ly
(74) *Attorney, Agent, or Firm* — Fish & Richardson P.C.

(57) ABSTRACT

A method for transmitting channel quality information for a downlink channel, the method includes receiving, by a user equipment (UE), configuration information on periodic channel state information (CSI) reporting by higher layer signaling; determining, by the UE, a channel quality information index considering the configuration information on CSI reporting; and transmitting the determined channel quality information index to a base station, wherein the channel quality information index is determined based on a number of available resource element, and wherein an assumption of no resource element allocated for a Channel Status Information-Reference Signal (CSI-RS) is applied when the number of the available resource element is determined.

12 Claims, 18 Drawing Sheets

Related U.S. Application Data continuation of application No. 14/546,860, filed on Nov. 18, 2014, now Pat. No. 9,294,250, which is a continuation of application No. 13/509,489, filed as application No. PCT/KR2011/000216 on Jan. 12, 2011, now Pat. No. 8,917,665.

(60) Provisional application No. 61/296,007, filed on Jan. 18, 2010.

(51) Int. Cl.
  *H04L 1/00* (2006.01)
  *H04W 72/04* (2009.01)
  *H04B 7/0413* (2017.01)
  *H04B 7/06* (2006.01)
  *H04W 88/02* (2009.01)
  *H04W 88/08* (2009.01)

(52) U.S. Cl.
  CPC .......... *H04L 1/0026* (2013.01); *H04L 5/0051* (2013.01); *H04L 5/0057* (2013.01); *H04W 72/0413* (2013.01); *H04L 5/0007* (2013.01); *H04W 88/02* (2013.01); *H04W 88/08* (2013.01)

(56) References Cited

U.S. PATENT DOCUMENTS

| | | | | |
|---|---|---|---|---|
| 8,917,665 | B2 * | 12/2014 | Seo | H04L 1/0026 370/328 |
| 9,294,250 | B2 * | 3/2016 | Seo | H04L 1/0026 370/328 |
| 9,722,749 | B2 * | 8/2017 | Seo | H04L 1/0026 370/328 |
| 2008/0095185 | A1 | 4/2008 | DiGirolamo et al. | |
| 2008/0225822 | A1 | 9/2008 | Zhang et al. | |
| 2009/0196366 | A1 | 8/2009 | Shen et al. | |
| 2009/0207784 | A1 | 8/2009 | Lee et al. | |
| 2010/0067627 | A1 | 3/2010 | Lincoln et al. | |
| 2010/0091724 | A1 | 4/2010 | Ishii et al. | |
| 2010/0165931 | A1 | 7/2010 | Nimbalker et al. | |
| 2010/0189038 | A1 | 7/2010 | Chen et al. | |
| 2010/0195707 | A1 | 8/2010 | Duan et al. | |
| 2010/0214937 | A1 | 8/2010 | Chen et al. | |
| 2010/0226327 | A1 | 9/2010 | Zhang et al. | |
| 2010/0323612 | A1 | 12/2010 | Xu et al. | |
| 2011/0002233 | A1 | 1/2011 | Hammarwall et al. | |
| 2011/0051827 | A1 | 3/2011 | Cho et al. | |
| 2011/0141987 | A1 | 6/2011 | Nam et al. | |
| 2011/0149886 | A1 | 6/2011 | Xu et al. | |
| 2011/0261774 | A1 | 10/2011 | Lunttila et al. | |
| 2011/0305268 | A1 | 12/2011 | Lindoff et al. | |
| 2011/0317656 | A1 | 12/2011 | Rajih et al. | |
| 2011/0317657 | A1 | 12/2011 | Chmiel et al. | |
| 2012/0008517 | A1 | 1/2012 | Imamura et al. | |
| 2012/0021753 | A1 | 1/2012 | Damnjanovic et al. | |
| 2013/0003681 | A1 | 1/2013 | Earnshaw et al. | |
| 2013/0064122 | A1 | 3/2013 | Hammarwall et al. | |
| 2013/0242975 | A1 | 9/2013 | Krishnamurthy et al. | |

FOREIGN PATENT DOCUMENTS

| | | |
|---|---|---|
| WO | WO 2007/089126 A2 | 8/2007 |
| WO | WO 2011/074807 A2 | 6/2011 |

OTHER PUBLICATIONS

Samsung, "Discussion on CSI-RS based CQI Reporting for Rel-10", 3GPP TSG RAN WG1 #59bis, R1-100113, Jan. 18-22, 2010 (6 pages).

ZTE, "Considerations on Demodulation Reference Signal in Backhaul Downlink," TSG-RAN WG1 #58, R1-093204, Aug. 24-28, 2009, Zhenzhen, China, pp. 1-6.

LG Electronics, "Consideration on DM-RS Design for LTE-Advanced," 3GPP TSG RAN WG1 Meeting #57, R1-092109, San Francisco, USA, May 4-8, 2009, 3 pages.

LG Electronics, "Issues on Downlink RS for LTE-Advanced," 3GPP TSG RAN WG1 Meeting #57, R1-092110, San Francisco, USA, May 4-8, 2009, 3 pages.

ZTE, "Investigation for DMRS of rank 5-8," 3GPP TSG RAN WG1 Meeting #59, R1-094751, Jeju, Korea, Nov. 9-13, 2009, 12 pages.

Texas Instruments, "Dynamic SU/MU Switching with Multi-Rank PMI/CQI Feedback," 3GPP TSG-RAN WG1 #59bis, R1-100454, Valencia, Spain, Jan. 18-22, 2010, 5 pages.

* cited by examiner (a)

(b)

(a)

(b)

☐ : Control Channel region
⊠ : DMRS (CDM group 1)
▨ : DMRS (CDM group 2)
▧ : CRS
☐ : Data region

METHOD AND AN APPARATUS FOR PROVIDING CHANNEL QUALITY INFORMATION IN A WIRELESS COMMUNICATION SYSTEM

CROSS-REFERENCE TO RELATED APPLICATIONS

This Application is a Continuation of U.S. patent application Ser. No. 15/048,569 filed on Feb. 19, 2016 (now U.S. Pat. No. 9,722,749 issued on Aug. 1, 2017), which is a Continuation of U.S. patent application Ser. No. 14/546,860 filed on Nov. 18, 2014 (now U.S. Pat. No. 9,294,250 issued on Mar. 22, 2016), which is a Continuation of U.S. patent application Ser. No. 13/509,489 filed on May 11, 2012 (now U.S. Pat. No. 8,917,665 issued on Dec. 23, 2014), which is the National Phase of PCT International Application No. PCT/KR2011/000216 filed on Jan. 12, 2011, which claims the benefit under 35 U.S.C. § 119(e) to U.S. Provisional Application No. 61/296,007 filed on Jan. 18, 2010, all of which are hereby expressly incorporated by reference into the present application.

BACKGROUND OF THE INVENTION

Field of the Invention

The following description of the present invention relates to a wireless communication system and, more particularly, to a method and an apparatus for providing channel quality information in a wireless communication system.

Discussion of the Related Art

A Multiple Input Multiple Output (MIMO) system refers to a system that can enhance transmission and reception efficiency of data by using multiple transmitting antennae and multiple receiving antennae. The MIMO technology includes a spatial diversity scheme and a spatial multiplexing scheme. The spatial diversity scheme may increase transmission reliability or may widen a cell range through a diversity gain. Thus, the spatial diversity scheme is suitable for data transmission with respect to a user equipment moving at a high speed. And, by transmitting different data simultaneously, the spatial multiplexing scheme may increase the data transmission rate without increasing the system bandwidth.

In the MIMO system, each transmitting antenna has an independent data channel. The transmitting antenna may signify a virtual antenna or a physical antenna. A reception entity may estimate a channel with respect to each transmitting antenna of a transmission entity, thereby being capable of receiving data transmitted from each transmitting antenna. Channel estimation refers to a process of recovering a received signal by compensating for a distortion in a signal, which is caused by fading. Herein, fading refers to an effect wherein the strength of a signal is changed rapidly due to a multi path-time delay in a wireless communication system environment. In order to perform channel estimation, a reference signal commonly known to the transmission entity and the reception entity is required. A reference signal may also be simply referred to as an RS (Reference Signal) or a Pilot. Also, the reception entity may determine the channel information based upon a measurement of the received reference signal and may feedback the determined channel information to the transmission entity.

A downlink reference signal corresponds to a pilot signal for coherent demodulation of downlink channel, such as PDSCH (Physical Downlink Shared CHannel), PCFICH (Physical Control Format Indicator CHannel), PHICH (Physical Hybrid Indicator CHannel), PDCCH (Physical Downlink Control CHannel), and so on. The downlink reference signal may include a Common Reference Signal (CRS) commonly shared by all user equipments within a cell, and a Dedicated Reference Signal (DRS) specified only for a specific user equipment. The Common Reference Signal (CRS) may also be referred to as a cell-specific reference signal. And, the Dedicated Reference Signal (DRS) may also be referred to as a UE-specific reference signal.

SUMMARY OF THE INVENTION

Discussions on an evolved (or advanced) system (e.g., LTE-Advanced (LTE-A) system) of the conventional 3GPP LTE (Long Term Evolution) system (e.g., a 3GPP LTE release-8 system) are currently under process. Among the reference signals being considered in the LTE-A system, in a reference signal for PDSCH demodulation (DeModulation Reference Signal (DMRS)), a number of Resource Elements (REs) being allocated to wireless resource may be varied in accordance with a channel rank. If channel information is calculated without taking into consideration the number of DMRS REs, which is varied in accordance with the rank, resources may be wasted or inaccurate channel information may be fed-back.

The present invention proposes a method and an apparatus for providing more accurate channel quality information, by considering a change in the number of REs being used by the PDSCH with respect to the rank.

To achieve these objects and other advantages and in accordance with the purpose of the invention, as embodied and broadly described herein, according to an embodiment of the present invention, a method for transmitting channel quality information for a downlink channel includes receiving a downlink signal; calculating a channel quality information index for the received downlink signal at least based on a number of resource elements for a physical downlink shared channel (PDSCH), wherein the number of resource elements for the PDSCH is determined at least based on an overhead of a demodulation reference signal (DMRS); and transmitting the calculated channel quality information index.

The overhead of the DMRS within one resource block is 12 resource elements for lower ranks and is 24 resource elements for higher ranks. The lower ranks include rank 1 and rank 2 and the higher ranks include rank 3 to rank 8, or the lower ranks include rank 1 to rank 4 and the higher ranks include rank 5 to rank 8. Alternatively, the overhead of the DMRS within one resource block is 24 resource elements regardless of downlink transmission rank.

In case that the downlink is a backhaul downlink, the PDSCH is a relay-PDSCH (R-PDSCH), the overhead of the DMRS within one resource block is 6 resource elements for lower ranks, and the overhead of the DMRS within one resource block is 12 resource elements for higher ranks. Further, the lower ranks include rank 1 and rank 2 and the higher ranks include rank 3 to rank 8, or wherein the lower ranks include rank 1 to rank 4 and the higher ranks include rank 5 to rank 8. Alternatively, the overhead of the DMRS within one resource block is 12 resource elements regardless of downlink transmission rank.

According to another embodiment of the present invention, a method for receiving channel quality information for a downlink channel includes transmitting a downlink signal; receiving a channel quality information index for the transmitted downlink signal, wherein the channel quality information index is calculated by the downlink reception entity at least based on a number of resource elements for a physical downlink shared channel (PDSCH), and the number of resource elements for the PDSCH is determined at least based on an overhead of a demodulation reference signal (DMRS); and transmitting the downlink signal at least based on the channel quality information index.

According to yet another embodiment of the present invention, a user equipment for transmitting channel quality information for a downlink channel includes a receiving module configured to receive a downlink signal from a base station; a transmitting module configured to transmit an uplink signal to the base station; and a processor configured to be connected to the receiving module and the transmitting module and to control operations of the user equipment, the processor is further configured to: calculate a channel quality information index for the downlink signal received through the receiving module at least based on a number of resource elements for a physical downlink shared channel (PDSCH), wherein the number of resource elements for the PDSCH is determined at least based on an overhead of a demodulation reference signal (DMRS), and transmit the calculated channel quality information index through the transmitting module.

The overhead of the DMRS within one resource block is 12 resource elements for lower ranks, and the overhead of the DMRS within one resource block is 24 resource elements for higher ranks. The lower ranks include rank 1 and rank 2 and the higher ranks include rank 3 to rank 8, or the lower ranks include rank 1 to rank 4 and the higher ranks include rank 5 to rank 8. Alternatively, the overhead of the DRMS within one resource block is 24 resource elements regardless of downlink transmission rank.

According to yet another embodiment of the present invention, a relay node for transmitting channel quality information for a backhaul downlink channel includes a receiving module configured to receive a backhaul downlink signal from a base station and to receive an access uplink signal from a user equipment; a transmitting module configured to transmit a backhaul uplink signal to the base station and to transmit an access downlink signal to the user equipment; and a processor configured to be connected to the receiving module and the transmitting module and to control operations of the relay node, the processor is further configured to: calculate a channel quality information index for the backhaul downlink signal received through the receiving module at least based on a number of resource elements for a Relay-physical downlink shared channel (R-PDSCH), wherein the number of resource elements for the PDSCH is determined at least based on an overhead of a demodulation reference signal (DMRS), and transmit the calculated channel quality information index to the base station through the transmitting module.

The overhead of the DRMS within one resource block is 6 resource elements for lower ranks, and the overhead of the DRMS within one resource block is 12 resource elements for higher ranks.

The lower ranks include rank 1 and rank 2 and the higher ranks include rank 3 to rank 8, or the lower ranks include rank 1 to rank 4 and the higher ranks include rank 5 to rank 8.

Alternatively, the overhead of the DRMS within one resource block is 12 resource elements regardless of downlink transmission rank.

According to yet another embodiment of the present invention, a base station for receiving channel quality information for a downlink channel includes a receiving module configured to receive an uplink signal from a downlink reception entity; a transmitting module configured to transmit a downlink signal to the downlink reception entity; and a processor configured to be connected to the receiving module and the transmitting module, so as to control operations of the base station, the processor is further configured to: receive a channel quality information index for the downlink signal transmitted through the transmitting module, wherein the channel quality information index is calculated by the downlink reception entity at least based on a number of resource elements for a physical downlink shared channel (PDSCH), and the number of resource elements for the PDSCH is determined at least based on an overhead of a demodulation reference signal (DMRS), and transmit the downlink signal at least based on the channel quality information index.

The above-mentioned general description of the present invention and the above-mentioned detailed description of the present invention are merely exemplary and correspond to an additional description of the appended claims of the present invention.

According to each of the above-described embodiments of the present invention, by considering the change in the number of REs, which are used in the PDSCH in accordance with the rank, a waste in resource may be prevented and a method and an apparatus for providing more accurate channel quality information in a wireless communication system may be provided.

Additional advantages of the present application will be set forth in part in the description which follows and in part will become apparent to those having ordinary skill in the art upon examination of the following or may be learned from practice of the present application.

DETAILED DESCRIPTION OF THE INVENTION

Figure 1:
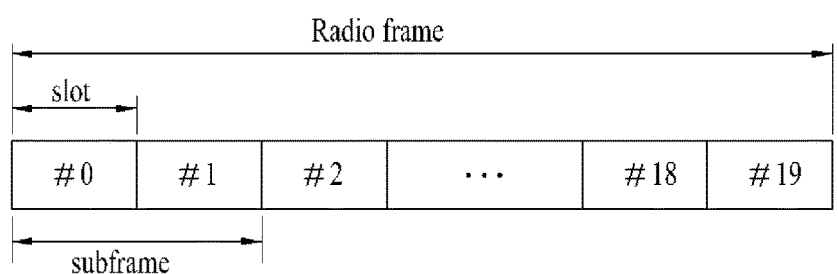
FIG. 1 illustrates a block view showing a structure of a transmitter equipped with multi-antennae.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on. In this document, the uplink transmission entity may signify a user equipment or a relay station, and the uplink reception entity may signify a base station or a relay station. And, similarly, the downlink transmission entity may signify a base station or a relay station, and the downlink reception entity may signify a user equipment or a relay station. In other words, an uplink transmission may refer to a transmission from a user equipment to a base station, a transmission from a user equipment to a relay station, or a transmission from a relay station to a base station. Similarly, a downlink transmission may refer to a transmission from a base station to a user equipment, a transmission from a base station to a relay station, or a transmission from a relay station to a user equipment.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept of the present invention, some of the structures and devices disclosed in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

The structure of a downlink radio frame will now be described with reference to FIG. 1.

In a cellular OFDM wireless packet communication system, uplink/downlink data packet transmission is performed in unit of subframe, and one subframe is defined as a predetermined time duration including a plurality of OFDM symbols. A 3GPP LTE standard supports a type 1 radio frame structure, which can be applied to an FDD (Frequency Division Duplex) and also supports a type 2 radio frame structure, which can be applied to a TDD (Time Division Duplex).

FIG. 1 illustrates the structure of a type 1 radio frame. A downlink radio frame consists of 10 subframes, and one subframe consists of 2 slots in a time domain. The time taken for transmitting one subframe is referred to as a TTI (transmission time interval), and, for example, the length of one subframe may be equal to 1 ms, and the length of one slot may be equal to 0.5 ms. One slot includes a plurality of OFDM symbols in a time domain and includes a plurality of Resource Blocks (RBs) in a frequency domain. Since the 3GPP LTE system uses the OFDMA in a downlink, an OFDM symbol indicates one symbol duration. The OFDM symbol may also be referred to as an SC-FDMA symbol or a symbol duration. A Resource Block (RB) corresponds to a resource allocation unit, and one Resource Block may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot is smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the inter-symbol interference.

In case of the usage of a normal CP, since one slot includes 7 OFDM symbols, one subframe includes 14 OFDM symbols. At this point, the first 2 or 3 OFDM symbols of each subframe are allocated to a PDCCH (physical downlink control channel), and the remaining OFDM symbols may be allocated to a PDSCH (physical downlink shared channel).

The structure of the radio frame is merely exemplary. And, therefore, the number of subframes included in the radio frame or the number of slots included in a subframe, and the number of symbols included in one slot may be diversely varied.

Figure 2:
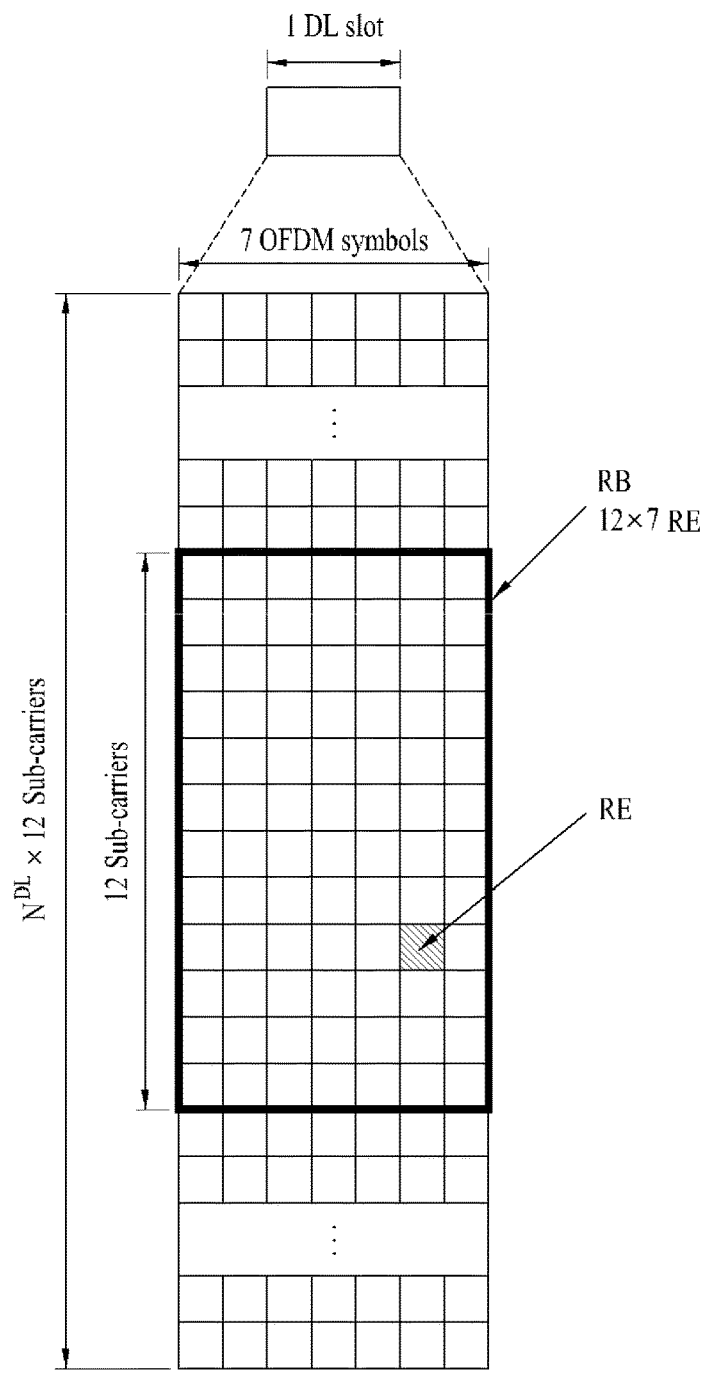
FIG. 2 illustrates a drawing showing a structure of a downlink radio frame.

FIG. 2 illustrates an exemplary drawing of a resource grid of a downlink slot. This corresponds to when the OFDM symbol is configured of a normal CP. Referring to FIG. 2, one downlink slot includes a plurality of OFDM symbols in the time domain and includes a plurality resource blocks in the frequency domain. Herein, although it is shown that one downlink slot includes 7 OFDM symbols in the time domain, and that one resource block (RB) includes 12 sub-carriers in the frequency domain, this is merely exemplary and not limited thereto. Each element within the resource grid is referred to as a resource element (RE). For example, the resource element a(k,l) corresponds to a resource element located in the $k^{th}$ sub carrier and the $l^{th}$ OFDM symbol. In case of a normal CP, one resource block includes 12×7 resource elements (in case of an extended CP, one resource block includes 12×6 resource elements). Since the size of each subcarrier is 15 kHz, one resource block includes approximately 180 kHz in the frequency domain. $N^{DL}$ corresponds to a number of resource blocks included in a downlink slot. The value of $N^{DL}$ may be determined in accordance with a downlink transmission bandwidth configured by the scheduling of the base station.

Figure 3:
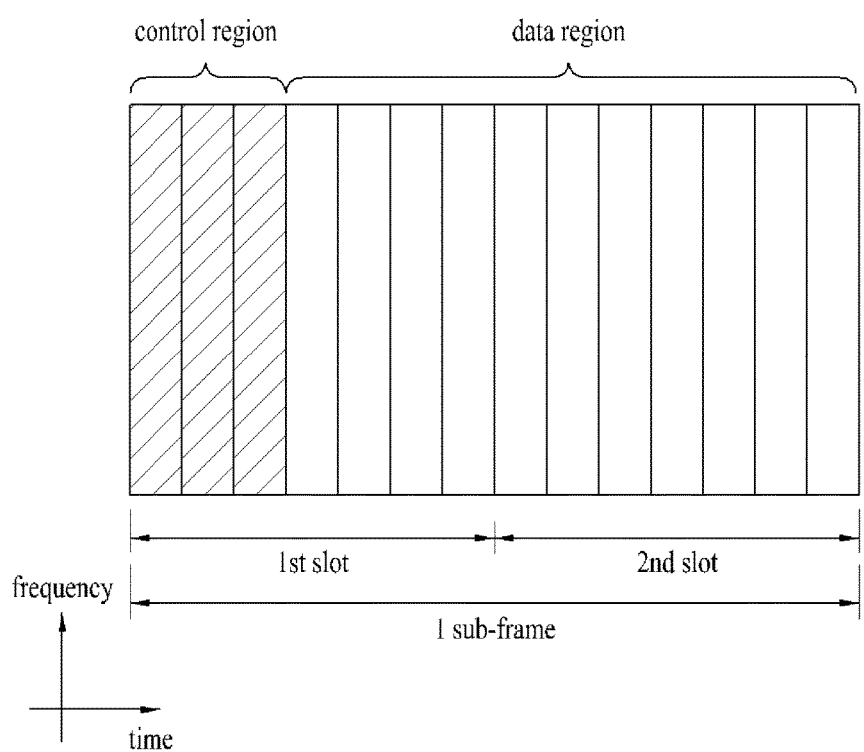
FIG. 3 illustrates an exemplary drawing of a resource grid with respect to one downlink slot.

FIG. 3 illustrates the structure of a downlink subframe. In one subframe, a maximum of 3 OFDM symbols located at the front portion of a first slot within one sub-frame corresponds to a control region wherein a control channel is allocated. The remaining OFDM symbols correspond to a data region wherein a Physical Downlink Shared Channel (PDSCH) is assigned. A basic unit of transmission is one subframe. That is, PDCCH and PDSCH are allocated over two slots. Downlink control channels used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH is transmitted in the first OFDM symbol of a sub-frame and includes information on the number of OFDM symbols used for the control channel transmission within the sub-frame. The PHICH includes HARQ ACK/NACK signals in response to an uplink transmission. The control information being transmitted through the PDCCH is referred to as Downlink Control Information (DCI). The DCI may include uplink or downlink scheduling information or may include an uplink transmission power control command for a certain terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of a higher layer control message such as a Random Access Response transmitted over the PDSCH, a set of transmission power control commands for individual user equipments within the certain user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one consecutive Control Channel Elements (CCEs). A CCE corresponds to a logical allocation unit used for providing a PDCCH at a coding rate based on a wireless channel state. Herein, the CCE corresponds to a plurality of resource element groups. The formats and the number of available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or usage of the PDCCH, the CRC may be masked by a Radio Network Temporary Identifier (RNTI). If the PDCCH is for a specific user equipment, a cell-RNTI (C-RNTI) identifier of the user equipment may be masked to the CRC. Alternatively, if the PDCCH is for a paging message, a Paging Indicator Identifier (P-RNTI) may be masked to the CRC. If the PDCCH is for a system information (more specifically, a system information block (SIB)), a system information identifier and a system information RNTI (SI-RNTI) may be masked to the CRC. In order to indicate the random access response, which is a response message to the transmission of a random access preamble of the user equipment, a random access RNTI (RA-RNTI) may be masked to the CRC.

Figure 4:
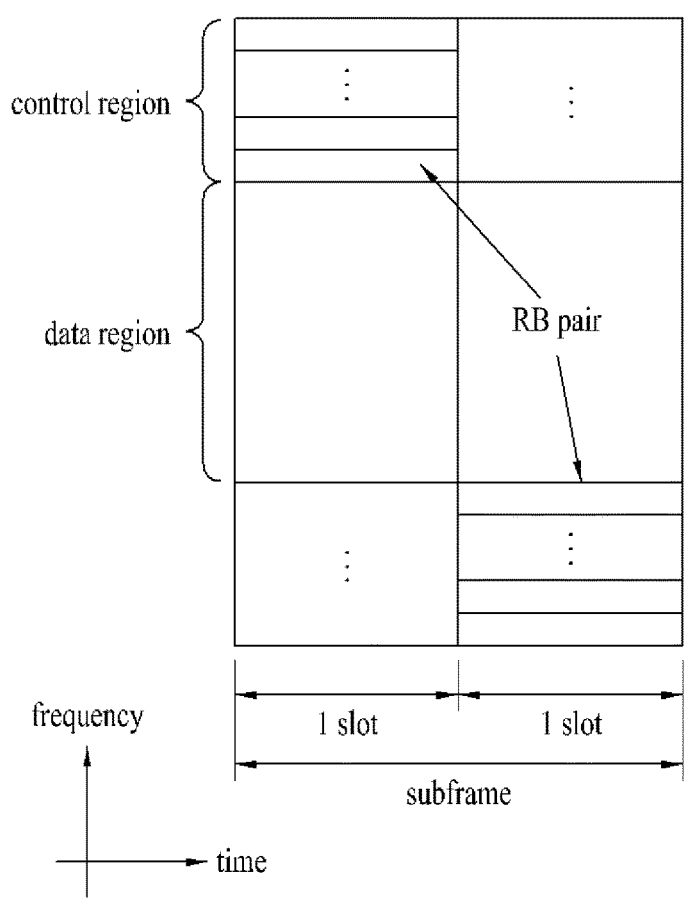
FIG. 4 illustrates a drawing showing a structure of a downlink sub-frame.

FIG. 4 illustrates the exemplary structure of an uplink subframe. In a frequency domain, an uplink sub-frame may be divided into a control region and a data region. A Physical Uplink Control Channel (PUCCH) including uplink control information is allocated to the control region. And, a Physical uplink shared channel (PUSCH) including user data is allocated to the data region. In order to maintain the single carrier property, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This state may be referred to as the resource block pair, which is allocated to the PUCCH, as being "frequency-hopped" at the slot boundary.

Modeling of a Multi-Antennae (MIMO) System

A MIMO system is a system that can enhance data transmission and reception efficiency by using multiple transmitting antennae and multiple receiving antennae. The MIMO technique does not rely on a single antenna path in order to receive an entire message. Instead, the MIMO technique may combine a plurality of data segments that is received through a plurality of antennae, thereby receiving the entire data.

Figure 5:
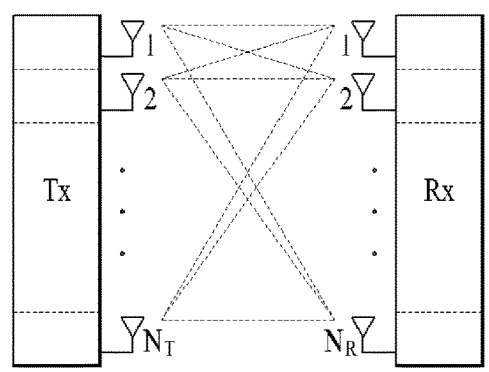
FIG. 5 illustrates a structural view of a wireless communication system having multi-antennae.
Figure 5:
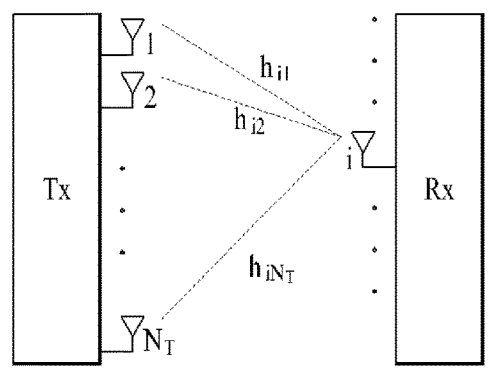

FIG. 5 illustrates a block view showing the structure of a wireless communication system having multiple antennae. As shown in FIG. 5(a), if the number of transmitting antennae is increased to $N_T$, and if the number of receiving antennae is increased to $N_R$, unlike in the case wherein multiple antennae are used only in the transmitter or the receiver, a logical channel transmission capacity increases in proportion with the number of antennae. Therefore, the transmission rate may be enhanced, and the frequency efficiency may be drastically enhanced. In accordance with the increase in the channel transmission capacity, the transmission rate may be theoretically increased as much as a value of a maximum transmission rate ($R_o$) using a single antenna multiplied by a rate increase ratio ($R_i$).

$$R_i = \min(N_T, N_R) \quad \text{[Equation 1]}$$

For example, a MIMO communication system using 4 transmitting antennae and 4 receiving antennae may theoretically gain a transmission rate 4 times greater than that of a single antenna system. After the theoretical capacity increase of a multi antennae system has been proven in the mid 90s, diverse technologies for realizing a substantial enhancement in the data transmission rate is still under active research and development. Moreover, some of the technologies are already being reflected and applied in diverse standards in wireless communication, such as the 3rd generation mobile communications, the next generation wireless LAN, and so on.

Referring to the trend in the many researches on multi antennae up to the most recent research, research and development on a wide range of perspectives have been actively carried out, wherein the fields of research include research in the aspect of information theory associated with multi antennae communication capacity calculation, research in wireless channel measurement and drawing out models, research in time-spatial signal processing technology for enhancing transmission reliability and enhancing transmission rate, and so on, in diverse channel environments and multiple access environments.

A communications method in a multi antennae system using mathematical modeling will now be described in detail. Herein, it is assumed that there are $N_T$ number of transmitting antennae and $N_R$ number of receiving antennae in the system.

Referring to a transmitted signal, when there are $N_T$ transmitting antennae, the maximum number of transmittable information is $N_T$. The transmission information may be expressed as shown below.

$$s = [s_1, s_2, \ldots, s_{N_T}]^T \quad \text{[Equation 2]}$$

Each of the transmission information $s_1, s_2, \ldots, s_{N_T}$ may have a different transmission power. When each of the transmission power is referred to as $P_1, P_2, \ldots, P_{N_T}$, the transmission information with adjusted respective transmission power may be expressed as shown below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Moreover, by using a diagonal matrix P of the transmission power, $\hat{s}$ may be expressed as shown below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Herein, consideration is made on a case wherein $N_T$ number of actually transmitted signals $x_1, x_2, \ldots, x_{N_T}$ are configured by having a weight matrix W applied to an information vector $\hat{s}$ with adjusted transmission power. The weight matrix W performs the role of adequately distributing transmission information to each antenna in accordance with the transmission channel status. By using a vector X, $x_1, x_2, \ldots, x_{N_T}$ may be expressed as shown below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, $w_{ij}$ represents a weight between an $i^{th}$ transmitting antenna and a $j^{th}$ information. W may also be referred to as a precoding matrix.

Meanwhile, different methods may be considered for the transmitted signal x depending upon 2 different types (e.g., spatial diversity and spatial multiplexing) of the transmitted signal x. In case of spatial multiplexing, different signals are multiplexed, and the multiplexed signals are transmitted to the receiving end, so that elements of the information vector(s) may have different values. Meanwhile, in case of spatial diversity, the same signal is repeatedly transmitted through a plurality of channel paths, so that elements of the information vector(s) may have the same value. Evidently, a combination of spatial multiplexing and spatial diversity may also be considered. More specifically, the same signal may be transmitted through, for example, 3 transmitting antennae according to the spatial diversity method, and the remaining signals may be processed with spatial multiplexing, thereby being transmitted to the receiving end.

When there are $N_R$ number of receiving antennae, the received signals $y_1, y_2, \ldots, y_{N_R}$ of each of the receiving antennae may be expressed as a vector as shown below.

$$y = [y_1, y_2, \ldots, y_{N_R}]^T \qquad [\text{Equation 6}]$$

In case of modeling a channel in a multi antennae wireless communication system, a channel may be identified in accordance with a transmitting and receiving antenna index. Herein, a channel passing through receiving antenna i from transmitting antenna j will be expressed as $h_{ij}$. In $h_{ij}$, it should be noted that, in the index order, the receiving antenna index comes first, and the transmitting antenna index comes next.

FIG. 5(b) illustrates a channel from $N_T$ number of transmitting antennae to receiving antenna i. The channel may be grouped so as to be expressed in the form of a vector and a matrix. In FIG. 5(b), a channel starting from a total of $N_T$ number of transmitting antennae and being received to receiving antenna i may be expressed as shown below.

$$h_i^T = [h_{i1}, h_{i2}, \ldots, h_{iN_T}] \qquad [\text{Equation 7}]$$

Therefore, all channels starting from $N_T$ number of transmitting antennae and being received to $N_R$ number of receiving antennae may be expressed as shown below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad [\text{Equation 8}]$$

An actual channel passes through a channel matrix H, and an AWGN (Additive White Gaussian Noise) is added. The AWGN $n_1, n_2, \ldots n_{N_R}$ being added to each of the $N_R$ number of receiving antennae may be expressed as shown below.

$$n = [n_1, n_2, \ldots, n_{N_R}]^T \qquad [\text{Equation 9}]$$

A received signal may be expressed as shown below through the above-described equation modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad [\text{Equation 10}]$$

$$Hx + n$$

The number of rows and columns in a channel matrix H indicating the channel state may be decided by the number of transmitting and receiving antennae. The number of rows in the channel matrix H is equal to the number of receiving antennae $N_R$, and the number of columns in the channel matrix H is equal to the number of transmitting antennae $N_T$. More specifically, the channel matrix H corresponds to a matrix of $N_R \times N_T$.

A rank of a matrix is defined as a minimum number among the number of rows or columns that are independent from one another. Therefore, the rank of a matrix cannot be greater than the number of rows or the number of columns. The rank (rank(H)) of the channel matrix H is limited as shown below.

$$\text{rank}(H) \leq \min(N_T, N_R) \qquad [\text{Equation 11}]$$

In a MIMO transmission, a 'Rank' represents a number of paths that can independently transmit a signal, and a 'number of layers' indicates a number of signal streams being transmitted through each path. Generally, a transmitting end transmits a number of layers corresponding to the number of ranks used in the signal transmission. Therefore, unless mentioned differently, rank has the same meaning as the number of layers.

Reference Signal (RS)

In case of transmitting and receiving data by using multi antennae, the channel status between each transmitting antenna and receiving antenna should be known, so that a correct signal can be received. Therefore, a separate reference signal should exist for each transmitting antenna. Information for channel estimation and demodulation may be provided by a downlink reference signal (CRS and/or DMRS).

The CRS is used for estimating a channel in a physical antenna end, and can be commonly received by all user equipments (UEs) within a cell. The CRS is distributed through the entire bandwidth. The CRS may be used for the purposes of Channel State Information (CSI) acquisition and data demodulation.

DMRS (or UE-specific reference signal) is used for data demodulation. When performing multi antennae transmission, precoding weight used in a specific user equipment is directly used for the reference signal without modification, and the DMRS enables an equivalent channel to be estimated. The equivalent channel corresponds to a transmitting channel combined with a precoding weight, which transmitted from each of the transmitting antennae when the user equipment has received the reference signal. The conventional 3GPP LTE system (e.g., Release-8) supports a maximum of 4 transmitting antennae transmission, and a DMRS for Rank 1 Beamforming is defined. The DMRS for Rank 1 Beamforming is also indicated as a reference signal for an antenna port index 5.

Figure 6:
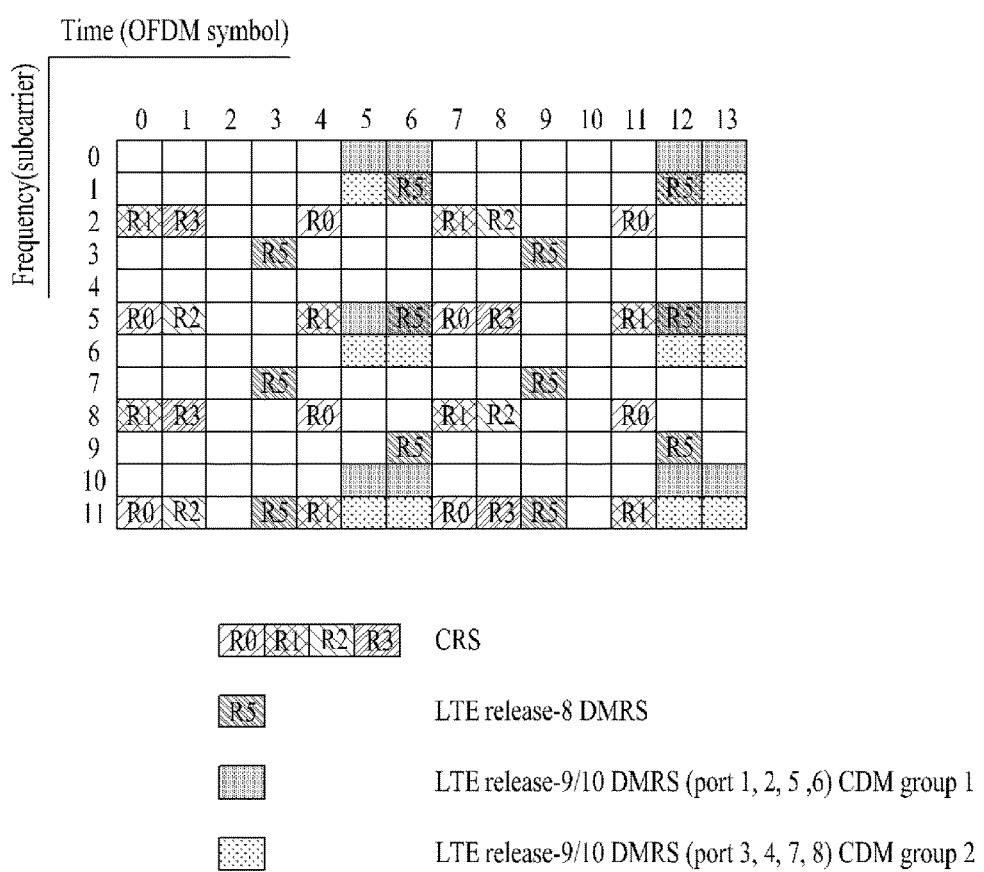
FIG. 6 illustrates a drawing showing a reference signal pattern within a downlink resource block.

FIG. 6 illustrates a pattern wherein a downlink CRS and DMRS are mapped on a downlink resource block. As a unit having a reference signal mapped therein, a downlink resource block may be expressed as a unit of one subframe (in time domain)×12 subcarriers (in frequency domain). More specifically, in case of a normal CP, one resource block has a length of 14 OFDM symbols in the time domain, and, in case of an extended CP, one resource block has a length of 12 OFDM symbols. FIG. 6 shows a downlink resource block, when a normal CP is used.

In FIG. 6, resource elements (RE) marked as 'R0', 'R1', 'R2', and 'R3' indicate CRS positions of antenna port indexes 0, 1, 2, and 3, respectively. Meanwhile, in FIG. 6, a resource element marked as 'R5' indicates a DMRS position defined in the conventional LTE system (e.g., LTE Release-8).

Meanwhile, in the LTE-A system, which is an evolved version of the 3GPP LTE system, an extended antenna configuration, MIMO of a high order, multi-cell transmission, evolved MU-MIMO, and so on, are taken into consideration. And, in order to operate an efficient reference signal and to support an evolved transmission method, a DMRS-based data demodulation process is also taken into consideration. More specifically, apart from a DMRS (R5) for Rank 1 Beamforming, which is defined in the conventional 3GPP LTE (e.g., 3GPP LTE Release-8), a DMRS for 2 or more layers may also be defined for supporting data transmission through an added antenna. It is preferable that such DMRS is set-up so as to exist only in a resource block and layer scheduled for a downlink transmission by the base station.

An exemplary DMRS pattern that is newly adopted in an LTE Release-9 or LTE-A (LTE Release-10 or subsequent LTE Release) system will now be described in detail with reference to FIG. 6 and FIG. 7. Hereinafter, the LTE Release-9 system and the LTE-A system will be collectively referred to as LTE-A system for simplicity. A DMRS that is used in a lower rank in the LTE Release-9/10 DMRS pattern may be positioned in 12 REs within a single resource block, and a DMRS that is used in a higher rank may be positioned in 24 REs within a single resource block. More specifically, the DMRS pattern shown in FIG. 6 corresponds to an exemplary DMRS pattern for Ranks 1 to 4, and, although the DMRS pattern for Ranks 5 to 8 has the same pattern as the DMRS pattern shown in FIG. 6, in case of Ranks 5 to 8 each CDM group may be configured to include 4 layers.

In positioning the LTE Release-9/10 DMRS for supporting a maximum of Rank 8 transmission within a radio resource, a DMRS for each layer may be multiplexed and positioned. Time Division Multiplexing (TDM) refers to positioning a DMRS for 2 or more layers in different time resources (e.g., OFDM symbols). Frequency Division Multiplexing (FDM) refers to positioning a DMRS for 2 or more layers in different frequency resources (e.g., subcarriers). Code Division Multiplexing (CDM) refers to multiplexing DMRS for 2 or more layers positioned in the same radio resource, by using an orthogonal sequence (or orthogonal covering) across OFDM symbols or across frequency subcarriers for the respective RS resource elements. Most particularly, an Orthogonal Cover Code, which is used for applying the CDM type multiplexing to the RS resource elements each having an DMRS positioned therein, may be abbreviated to OCC. For example, a Walsh code, a DFT (Discrete Fourier Transform) matrix, and so on may be used as the OCC.

The DMRS pattern of FIG. 6 shows a combination of CDM and FDM. For example, CDM Group 1 may be mapped to Ports 1, 2, 5, and 6, and CDM Group 2 may be mapped to Ports 3, 4, 7, and 8. The number of resource elements (REs) occupied by the DMRS for each channel rank may vary in accordance with such mapping relation. And, in case of the CDM+FDM method, 12 REs/RB/port may be used in Ranks 1 and 2 (FIG. 7(a)), and 24 REs/RB/port may be used in Ranks 3 to 8 (FIG. 7(b)). Alternatively, in addition to the combined method of the CDM and the FDM, a full CDM method may also be taken into consideration. The DMRS pattern of the full CDM method is identical to that shown in FIG. 6. However, when mapping the ports, CDM Group 1 may be mapped to Ports 1, 2, 3, and 4, and CDM Group 2 may be mapped to Ports 5, 6, 7, and 8. Accordingly, 12 REs/RB/port may be used in Ranks 1 to 4, and 24 REs/RB/port may be used in Ranks 5 to 8. However, the present invention will not be limited only to the above-described example, and, therefore, other adequate DMRS patterns may be used in accordance the respective transmission rank.

In both of the above-described methods, the number of REs occupied by the DMRS may be varied depending upon the rank, and 24 REs/RB/port in case of higher rank may have an overhead (or number of REs having the DMRS allocated thereto) 2 times larger than that of a lower rank.

Meanwhile, in order to support a Spectral Efficiency greater than that of the conventional 3GPP LTE system, the LTE-A system may have an extended antenna configuration. The extended antenna configuration may, for example, be configured of 8 transmitting antennae. A system having such an extended antenna configuration is required to support the operations of the conventional antenna configuration (i.e., backward compatibility). Therefore, the system with extended antenna configuration is required to support a reference signal pattern of the conventional antenna configuration, and a new reference signal pattern for an additional antenna configuration is also required. Herein, when a CRS for a new antenna port is added to a system having the conventional antenna configuration, a disadvantage may occur in that the reference signal overhead may increase abruptly, thereby decreasing the data transmission rate. Accordingly, taking such disadvantage into consideration, discussions are currently being made on the issue of designing a new reference signal (CSI-RS) for measuring channel state information (CSI) for the new antenna port. Since the CSI-RS does not correspond to a signal being transmitted from all subframes, in order to clarify the description of the present invention, the CSI-RS pattern will not be shown in FIGS. 6 and 7.

Transmission of Channel Quality Information

In the 3GPP LTE system, when a downlink reception entity (e.g., user equipment) is connected to (or accesses) a downlink transmission entity (e.g., base station), a measurement such as an RSRP (reference signal received power) and an RSRQ (reference signal received quality) for the reference signal transmitted via downlink may be performed at a certain time. And, the measured result may be reported to the base station on a periodic basis or on an event triggered basis.

In a cellular OFDM wireless packet communication system, each user equipment reports downlink channel information for each downlink channel status via uplink, and the base station may use the downlink channel information received from each user equipment, so as to decide a time/frequency resource and Modulation and Coding Scheme (MCS) suitable for the data transmission for each user equipment.

In case of the conventional 3GPP LTE system (e.g., 3GPP LTE Release-8 system), such channel information may include CQI (Channel Quality Indication), PMI (Precoding Matrix Indicator) and RI (Rank Indication). And, depending upon the transmission mode of each user equipment, all or part of the CQI, PMI, and RI may be transmitted. The CQI may be decided by a received signal quality of the user equipment, and the received signal quality may generally be decided based upon a measurement of a downlink reference signal. At this point, the CQI value that is actually being delivered to the base station corresponds to an MCS, which can yield a maximum performance while maintaining a Block Error Rate (BLER) to 10% or less in the measured received signal quality.

Also, the reporting method of such channel information may be divided into periodic reporting, wherein the channel information is periodically transmitted, and aperiodic reporting, wherein the channel information is transmitted in accordance with a request made by the base station.

In case of aperiodic reporting, reporting is set-up for each user equipment by a request bit included in uplink scheduling information delivered from the base station to the respective user equipment. And, when each of the user equipments receives this information, the respective user equipment may deliver the channel information, while taking into account the respective transmission mode, to the base station through a physical uplink shared channel (PUSCH).

In case of periodic reporting, a transmission period according to which channel information and an offset for the respective transmission period in subframe units are signaled via a higher layer signal to each user equipment. And, according to the decided transmission period, channel information considering the transmission mode of each user equipment may be delivered to the base station through a physical uplink control channel (PUCCH). In case data being transmitted via uplink exist simultaneously in a subframe in which channel information is being transmitted in accordance with the decided transmission period, the corresponding channel information may be transmitted along with data through a physical uplink shared channel (PUSCH) instead of being transmitted through a physical uplink control channel (PUCCH).

More specifically, the periodic reporting of channel information may be further divided into 4 reporting modes in accordance with feedback types of CQI and PMI as shown in Table 1 below.

TABLE 1

|  | PMI Feedback Type | |
| --- | --- | --- |
| PUCCH CQI Feedback Type | No PMI | Single PMI |
| Wideband (wideband CQI) | Mode 1-0 | Mode 1-1 |
| UE Selected (subband CQI) | Mode 2-0 | Mode 2-1 |

Depending upon the CQI feedback type, the reporting method is divided into WB (wideband) CQI and SB (subband) CQI, and depending upon the PMI transmission status, the reporting method is divided into No PMI and single PMI. Each user equipment may receive information including a combination of a period and an offset of the channel information transmission, through RRC signaling from a higher layer. Based upon the received information on the channel information transmission period, the user equipment may transmit channel information to the base station.

Figure 8:
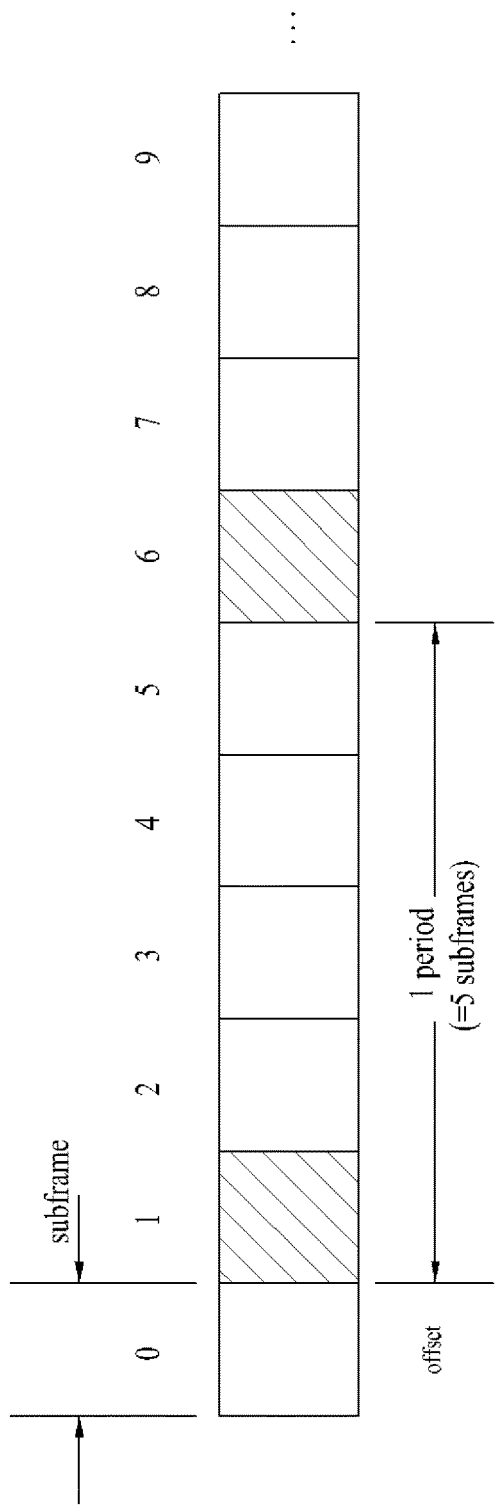
FIG. 8 illustrates a drawing showing an example of a periodic channel information transmitting method.

FIG. 8 illustrates an example of a method wherein the user equipment periodically transmits the channel information. For example, when the user equipment receives information of a combination of a transmission period of the channel information being equal to '5' and an offset being equal to '1', the user equipment transmits channel information in 5 subframe units. However, given that the $0^{th}$ subframe is the referential point, the channel information may be transmitted through the PUCCH with 1 subframe offset along an increasing direction of a subframe index. At this point, the index of a subframe may be configured of a combination of a system frame number ($n_f$) and 20 slot indexes ($n_s$, 0~19) within the system frame. Since one subframe is configured of 2 slots, a subframe index may be expressed as 10×$n_f$+ floor($n_s$/2). A floor(x) function signifies a maximum integer that is not greater than x.

Depending upon a CQI feedback type, a type transmitting only WB CQI and a type transmitting both WB CQI and SB CQI exist. In case of the type transmitting only the WB CQI, WB CQI information for the entire band is transmitted at a subframe corresponding to each CQI transmission period. The transmission period of a WB periodic CQI feedback may be set as {2, 5, 10, 16, 20, 32, 40, 64, 80, 160} ms or as not transmitted. At this point, if the PMI should also be transmitted in accordance with the PMI feedback type of Table 1, the PMI information is transmitted along with the CQI information. In case of the type transmitting both WB CQI and SB CQI, the WB CQI and the SB CQI are alternately transmitted.

Figure 9:
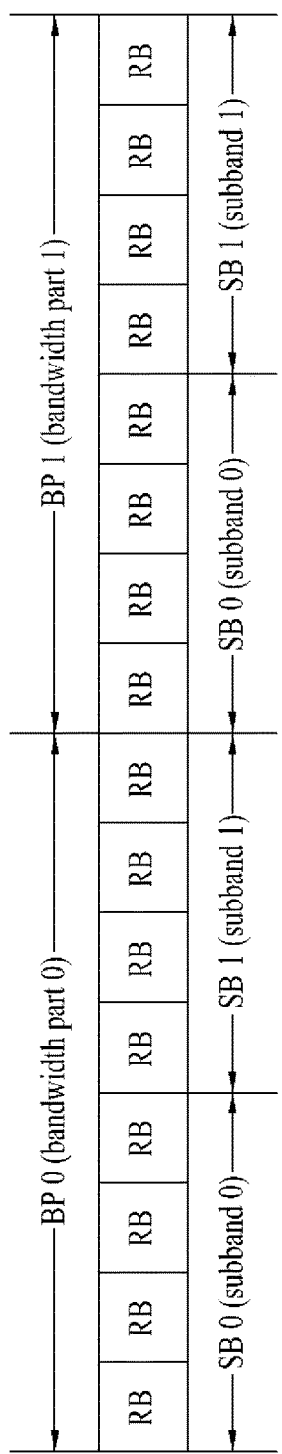
FIG. 9 illustrates a drawing showing an example of a method for transmitting a WB CQI and an SB CQI.

FIG. 9 illustrates an example of a method of transmitting both WB CQI and SB CQI. Herein, FIG. 9 illustrates a system frequency band configured of, for example, 16 resource blocks (RBs). In case of system frequency band having 16 RBs, the frequency band may be configured of two BPs (Bandwidth Parts) (BP0 and BP1), and each BP may be configured of two SBs (subbands) (SB0 and SB1), and each SB may be configured of 4 RBs. At this point, the number of BPs and the size of each SB may be decided depending upon the number of RBs configured in the system frequency band, and the number of SBs configuring each BP may be decided in accordance with the number of RBs, the number of BPs and the size of each SB.

In case of the type transmitting both WB CQI and SB CQI, after transmitting WB CQI in the CQI transmission subframe, a CQI for the SB having a better channel state among SB0 and SB1 within BP0 and the index of the corresponding SB are transmitted in the next CQI transmission subframe, and a CQI for the SB having a better channel state among SB0 and SB1 within BP1 and the index of the corresponding SB are transmitted in the following CQI transmission subframe. After transmitting the WB CQI as described above, the CQI information for each BP is sequentially transmitted. At this point, CQI information for a BP is sequentially transmitted 1~4 times between the two WB CQIs. For example, when CQI information on a BP is transmitted once between the two WB CQIs, transmission may be performed in the order of WB CQI→BP0 CQI→BP1 CQI→WB CQI. In another example, when CQI information on a BP is transmitted 4 times between the two WB CQIs, transmission may be performed in the order of WB CQI→BP0 CQI→BP1 CQI→BP0 CQI→BP1 CQI→BP0 CQI→BP1 CQI→BP0 CQI→BP1 CQI→WB CQI. Information on how many times the CQI for a BP is to be sequentially transmitted between the two WB CQIs is signaled from a higher layer. And, WB CQI or SB CQI may be transmitted through the PUCCH at a subframe according to the information of a combination of channel information transmission period and offset which are signaled from a higher layer as shown in FIG. 8.

At this point, in case a PMI should also be transmitted in accordance with the PMI feedback type, the PMI information is transmitted along with the CQI information. In this case, if a PUSCH for a uplink data transmission exists in the corresponding subframe, the CQI and PMI may be transmitted along with data through the PUSCH instead of the PUCCH.

Figure 10:
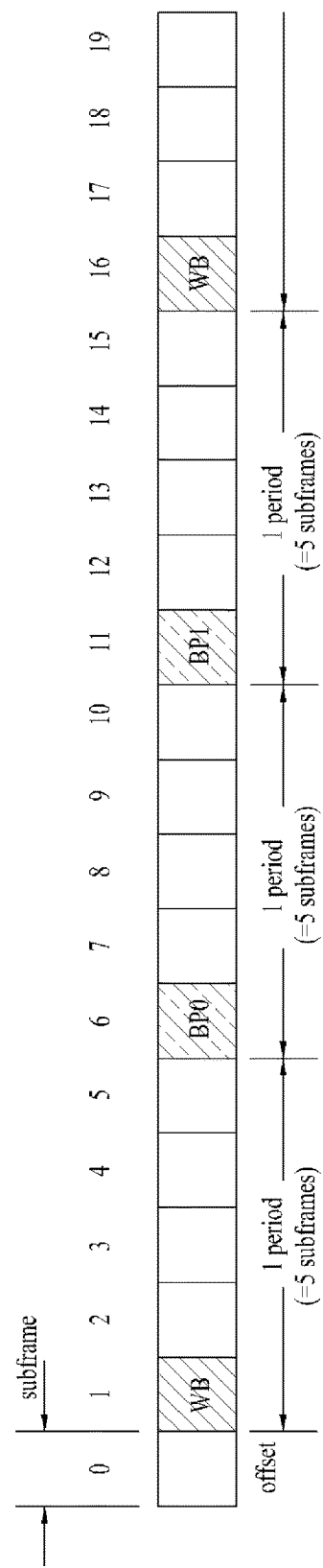
FIG. 10 illustrates a drawing showing an example of a CQI transmission method in case a WB CQI and an SB CQI are transmitted.

FIG. 10 illustrates an example of a CQI transmission method when both WB CQI and SB CQI are transmitted. Herein, FIG. 10 shows an exemplary channel information transmission operation of a user equipment, when a combined information of the channel information transmission period being equal to '5' and of the offset being equal to '1', as shown in FIG. 8, is signaled, and when the information on the BP is sequentially transmitted 1 time between the two WB CQIs.

Meanwhile, in case of the transmission of an RI, the RI may be signaled as a combined information including transmission period information of RI on which multiple of the WB CQI transmission period and information on an offset of the corresponding transmission period of RI. The offset in this case is defined as a relative offset with respect to a CQI transmission offset. For example, when the offset of a CQI transmission period is '1', and when the offset of a transmission period of an RI is '0', this indicates that the offset of the RI transmission period is identical to the offset of the CQI transmission period. The offset of RI transmission period may be defined to have a value of 0 or a negative number.

Figure 11:
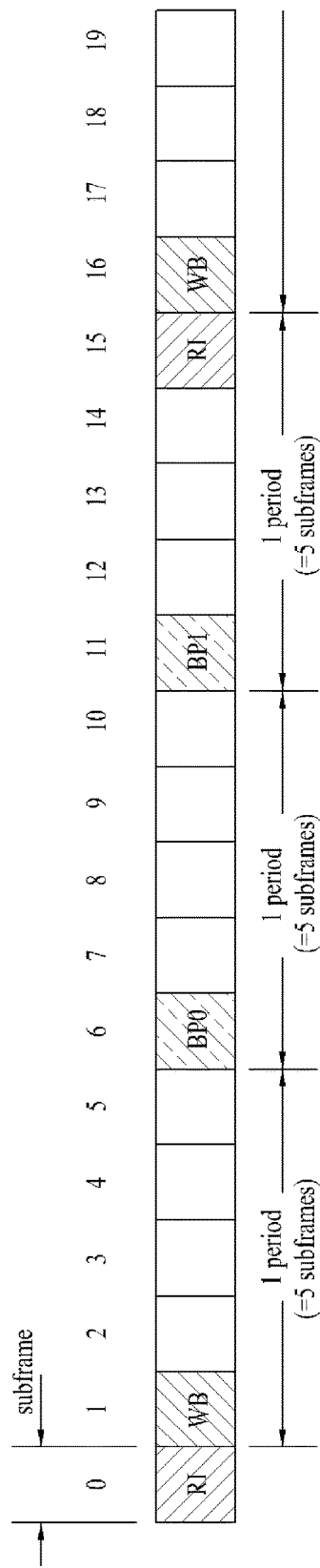
FIG. 11 illustrates a drawing for describing an RI transmission method.

FIG. 11 illustrates an exemplary case, wherein the RI transmission period is a multiple of '1' of the WB CQI transmission period, and wherein an offset of the RI transmission period is equal to '−1', when a CQI transmission is set up as shown in FIG. 10. Since the RI transmission period is a multiple of '1' of the WB CQI transmission period, the transmission period of the RI is identical to that of the WB CQI. Also, since the RI offset value '−1' signifies that the value '−1' is a relative value for the CQI offset value '1' shown in FIG. 10, the RI may be transmitted while having the subframe index #0 as the referential point. If the RI offset is equal to '0' instead of '−1', the transmission subframes of the WB CQI and the RI may overlap one another. And, in this case, the WB CQI may be dropped, so as to transmit the RI.

The CQI, PMI, and RI may be transmitted by the above-described combination, and such channel status information may be transmitted from each user equipment through RRC signaling of a higher layer. The base station may take into consideration the channel status of each user equipment and the user equipment distribution status within the base station, thereby being capable of transmitting adequate information to each user equipment.

Calculation of Channel Quality Information

When a user equipment calculates a channel quality indicator (CQI) index, it is defined in a 3GPP LTE standard document (e.g., 3GPP TS36.213) that the following assumptions are to be taken into consideration.

(1) The first 3 OFDM symbols of a subframe are occupied by control signaling.

(2) No resource elements used by primary or secondary synchronization signal or a physical broadcast channel (PBCH).

(3) CP length of the non-MBSFN subframes.

(4) Redundancy Version 0.

(5) The PDSCH transmission scheme depending on the transmission mode currently configured for the UE (which may be the default mode).

(6) The ratio of PDSCH EPRE (Energy Per Resource Element) to Cell-specific RS EPRE is as given with the exception for $\rho_A$ ($\rho_A$ may be assumed to be i) $\rho_A = P_A + \Delta_{offset} +$ 10 $\log_{10}(2)$[dB] for any modulation scheme, if the UE is configured with transmission mode 2 with 4 cell-specific antenna ports, or transmission mode 3 with 4 cell-specific antenna ports and the associated RI is equal to one; ii) $\rho_A = P_A + \Delta_{offset}$[dB] for any modulation scheme and any number of layers, otherwise; The shift $\Delta_{offset}$ is given by the parameter nomPDSCH-RS-EPRE-Offset which is configured by higher-layer signaling).

The above defined assumptions indicate that the CQI includes information on channel quality and diverse information on the corresponding user equipment. More specifically, even though the channel quality is identical, since different CQI indexes may be fed-back in accordance with the capability of the corresponding user equipment, a certain reference standard is defined.

Figure 12:
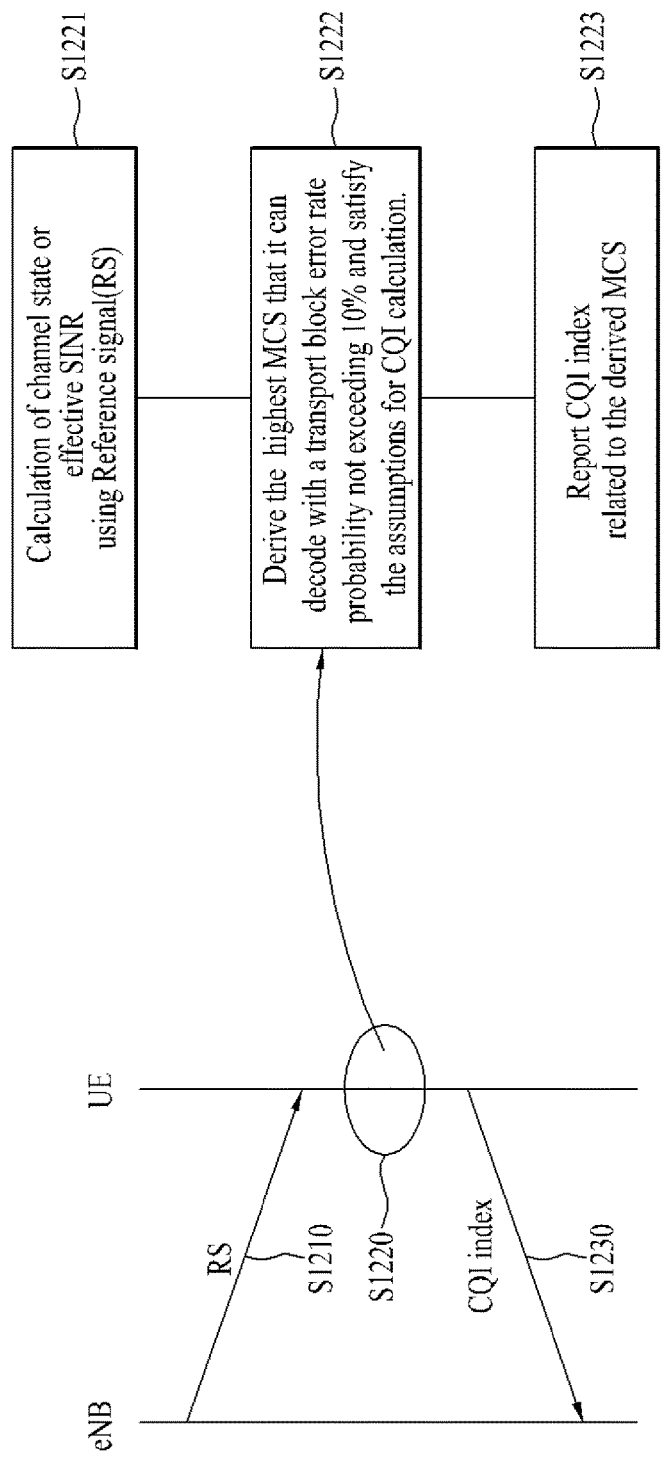
FIG. 12 illustrates a general method for calculating a CQI index.

FIG. 12 illustrates a general CQI index calculation method. As shown in FIG. 12, a user equipment (UE) may receive a reference signal (RS) from the base station (eNB) (S1210). The user equipment may determine the status of a channel through the received reference signal. Herein, the reference signal may correspond to a common reference signal (CRS) which is defined in the conventional 3GPP LTE system or may correspond to a channel state information-reference signal (CSI-RS) which is defined in a system having an extended antenna configuration (e.g., 3GPP LTE-A system). While satisfying the assumption given for CQI calculation from a channel determined by the user equipment through the reference signal, the user equipment may calculate a CQI index wherein the Block Error Rate (BLER) does not exceed 10% (S1220). The user equipment may transmit the calculated CQI index to the base station (S1230). In FIG. 12, the process wherein the user equipment determines the status of the channel and obtains an adequate MCS (S1220) may be designed in various methods in the aspect of implementing the user equipment. For example, the user equipment may use the reference signal so as to calculate a channel status or an effective SINR (Signal-to-Interference plus Noise Ratio) (S1221). Based upon the calculated channel status or effective SINR, the user equipment may derive the highest MCS (S1222). The highest MCS indicates an MCS having a Block Error Rate that does not exceed 10% when performing a decoding process, and wherein the MCS satisfies the assumption on the CQI calculation. The user equipment decides a CQI index associated with the derived MCS and may report the decided CQI index to the base station (S1223).

In the LTE-A system wherein the standardization process is currently in progress, discussions are being made on supporting new techniques such as bandwidth extension, Coordinated Multiple Point (CoMP) transmission and reception, relay, Multi-User MIMO (MU-MIMO) transmission method for a more enhanced performance. Therefore, while a more complicated structure (new reference signal, MU-MIMO, etc.) than that of the conventional LTE system is configured, backward compatibility may also be taken into consideration for a co-existence with the conventional LTE system. Accordingly, when calculating the CQI, the number of criteria that are to be considered is increased as compared to the conventional LTE system.

The present invention proposes a method for calculating a CQI in the LTE-A system and an assumption required for calculating CQI. In short, when considering the DMRS, the adoption of which in the LTE-A is currently under discussion, the present invention proposes a method enabling a CQI suitable for the current channel quality and for the available resources to be fed-back to the base station in addition to the CQI calculation of conventional LTE, by taking into consideration the size of the DMRS that varies in accordance with the channel rank.

As described above, in the LTE-A, the adoption of a reference signal for PDSCH demodulation (DMRS) and a reference signal for estimating channel state information (CSI-RI) is currently under discussion, and, herein, the DMRS may have the pattern as FIG. 6. As described above, the number of REs occupied by the DMRS may vary depending upon the rank, and the DMRS overhead in case of higher rank (24 REs/RB/port occupied) may be two times larger than that of a lower rank (12 Res/RB/port).

Figure 13:
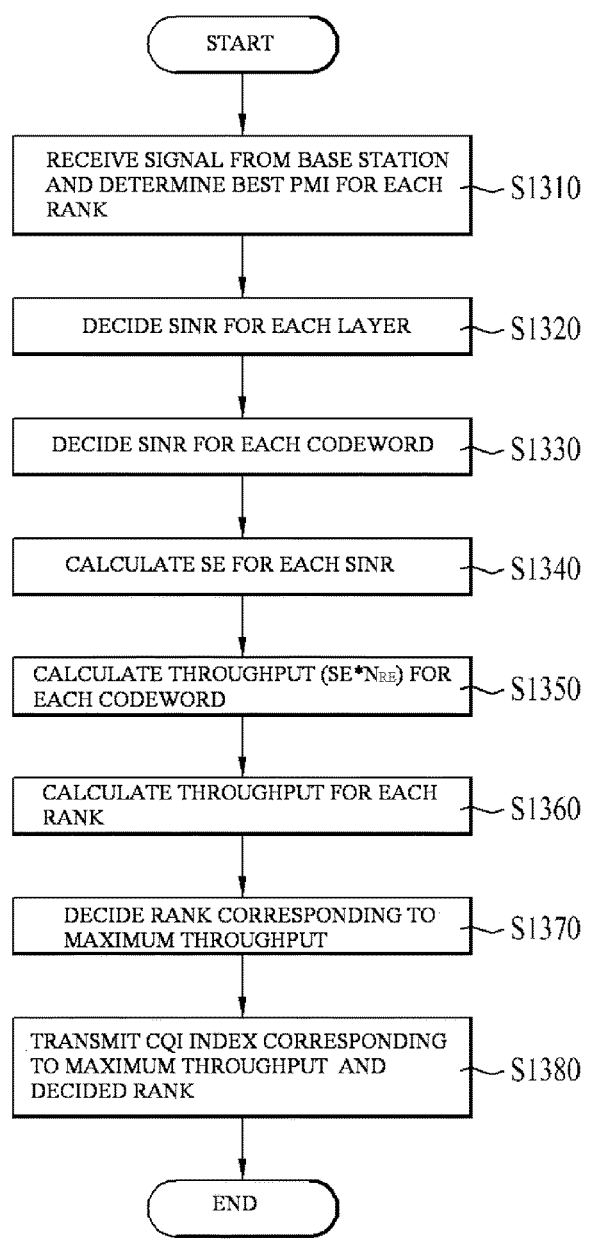
FIG. 13 illustrates a flow chart of an exemplary method for calculating a CQI index.

FIG. 13 illustrates a flow chart showing an exemplary method for calculating a CQI index.

In step S1310, the user equipment may use a signal received from the base station and determine a best PMI for each rank. For example, the user equipment may determine the best PMI for rank 1, the best PMI for rank 2, . . . , the best PMI for rank 8, respectively.

In step S1320, the user equipment may decide an SINR for each layer through the decided PMI. For example, in case of rank 2, 2 layers may exist, and the SINR for each of the 2 layers may be decided.

In step S1330, based upon the SINR decided for each layer, the user equipment may decide an SINR for each codeword. This may be decided in accordance with a codeword-to-layer mapping rule. The codeword-to-layer mapping rule may be decided as described below.

At least one or more codewords encoded by the encoder of the transmitting end may be scrambled by using a UE-specific scrambling signal. The scrambled codeword may be modulated to complex symbols by using modulation scheme of BPSK (Binary Phase Shift Keying), QPSK (Quadrature Phase Shift Keying), 16 QAM (Quadrature Amplitude Modulation) or 64QAM in accordance with the type of the transmitted signal and/or the channel status. Thereafter, the modulated complex symbols are mapped to one or more layers. If a signal is transmitted by using a single antenna, one codeword may be directly mapped to one layer and transmitted. However, if a signal is transmitted by using multi antennae, the codeword-to-layer mapping relation may be determined as shown below in Table 2 and Table 3 in accordance with the transmission scheme.

mapping relation between the number of codewords and the number of layers used for transmission may be known through the "Number of layers" and the "Number of codewords" shown in Table 2 and Table 3. And, the "Codeword-to-Layer mapping" indicates how the symbols of each codeword are being mapped to the respective layer.

As shown in Table 2 and Table 3, one codeword may be mapped to one layer in symbol units and transmitted. However, as shown in the second case of Table 3, one codeword may be distributively mapped to a maximum of 4 layers. And, when one codeword is distributively mapped to a plurality of layers, it can be known that the symbols of each codeword can be sequentially mapped to each layer and transmitted. Meanwhile, in case of configuring a single codeword-based transmission, one encoder and one modulating block may exist.

In step S1340, the user equipment may calculate a Spectral Efficiency (SE) best fitting each SINR for each codeword of a respective rank depending upon the user equipment capability.

In step S1350, the user equipment may calculate a throughput for each codeword by multiplying the calculated SE by the number of REs ($N_{RE}$) used for the PDSCH.

In step S1360, the user equipment may calculate a throughput for each rank by adding the throughputs calculated for each codeword in accordance with the respective rank.

TABLE 2

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(1)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

TABLE 3

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ If $M_{symb}^{(0)} \bmod 4 \neq 0$ two null symbols shall be appended to $d^{(0)}(M_{symb}^{(0)} - 1)$ |

Table 2 shown above corresponds to an exemplary case of signals being transmitted by using a Spatial Multiplexing method, and Table 3 shown above corresponds to an exemplary case of signals being transmitted by using a Transmit Diversity method. Also, in Table 2 and Table 3, $x^{(a)}(i)$ indicates an $i^{th}$ symbol of a layer having index a, and $d^{(a)}(i)$ represents an $i^{th}$ symbol of a codeword having index a. The In step S1370, the user equipment compares the throughput calculated for each rank and may decide a rank value corresponding to the largest throughput.

In step S1380, the user equipment may feedback the CQI index corresponding to the largest throughput and the corresponding rank to the base station. Herein, the process of deciding the CQI index corresponding to the largest throughput may be performed, for example, by using Table 4 shown below. Table 4 corresponds to an exemplary 4 bit CQI table, which is defined in the 3GPP LTE standard document TS36.213. In Table 4, a throughput obtained by multiplying an efficiency value defined for each CQI index by the $N_{RE}$ value is compared with a maximum available throughput in a current channel status calculated by the user equipment through process steps S1310 to S1370. Thereafter, the CQI index having the most similar value may be determined as the CQI index that is to be fed-back.

TABLE 4

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The process steps of S1310 to S1370 for deciding the CQI index are merely exemplary. Therefore, the present invention will not be limited only to the examples given herein. More specifically, depending upon the implementation of the user equipment, the CQI index value may be decided by using a variety of methods.

In deciding the CQI index that is to be fed-back as described above, the number of REs ($N_{RE}$) used for the PDSCH is an important factor. However, in the conventional CQI index calculation method, a change in the number of PDSCH REs was not considered. Therefore, in case the DMRS is adopted, accurate CQI information is required to be fed-back considering the fact that the value N varies in accordance with a change in the number of REs to which the DMRS is allocated in accordance with rank. In other words, if it is not taken into account that the number of PDSCH REs varies in accordance with rank, an inherent error may occur when the base station receives a feedback of the CQI index and estimate the user equipment status, and such inherent error may have a large influence on a subsequent process. More specifically, in case the DMRS overhead is not considered, CQI index may be determined on the assumption that a larger number of REs is used for the PDSCH transmission than the actual number of REs that can be used in the PDSCH transmission. When the base station decides the coding rate of the downlink data to a high coding rate and transmits the processed data based upon such incorrect CQI information, the number of REs allowing the user equipment to actually receive the downlink data may be smaller than the number of REs estimated by the base station. Therefore, the likelihood of the occurrence of an error is increased high, and, in some cases, it may be impossible to even perform the operation of receiving downlink data. In order to reduce such error, the present invention proposes a method that can increase the reliability of a CQI which is shared by the base station and the user equipment, by applying the value $N_{RE}$ for each rank in the CQI index calculation process considering the number of REs of a DMRS which varies in accordance with rank and by selecting the correct CQI index.

Referring back to FIG. 7, the process of allocating the RE for the PDSCH within a resource block (RB) considering a DMRS overhead during the CQI index calculation will now be described in detail. In case of FIG. 7, the assumptions for CQI calculation are made as shown below.

(1) PDCCH is allocated to the first 3 OFDM symbols of one subframe.

(2) The number of REs having the DMRS allocated thereto within one resource block (the length of one subframe in a time domain×the length of 12 subcarriers in a frequency domain) is equal to 12 in case of Ranks 1 and 2, and is equal to 24 in case of Ranks 3 to 8.

(3) The CSI-RS and the LTE-A subframe do not exist.

According to the above-described assumptions, in the cases of FIGS. 7(a) and (7)b, REs that can be allocated to PDSCH (data) transmission may be decided. FIG. 7(a) illustrates a case having a DMRS overhead of a lower rank (e.g., Ranks 1 to 2), and FIG. 7(b) illustrates a case having a DMRS overhead of a higher rank (e.g., Ranks 3 to 8).

In FIG. 7(a), the DMRS overhead within one resource block is 12 REs/RB/port, and an overhead of CRS for 4 transmitting antenna ports is 24 REs/RB/port, and the PDCCH occupies 3 OFDM symbols. Accordingly, the RE that is being allocated for the PDSCH (data) transmission corresponds to 104 REs/RB/port.

In FIG. 7(b), the DMRS overhead within one resource block is 24 REs/RB/port, and an overhead of CRS for 4 transmitting antenna ports is 24 REs/RB/port, and the PDCCH occupies 3 OFDM symbols. Accordingly, the RE that is being allocated for the PDSCH (data) transmission corresponds to 92 REs/RB/port.

Figure 7:
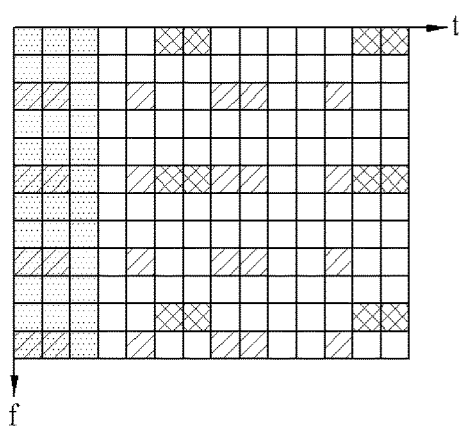
FIG. 7 illustrates a drawing for describing a DMRS overhead in accordance with a respective rank.
Figure 7:
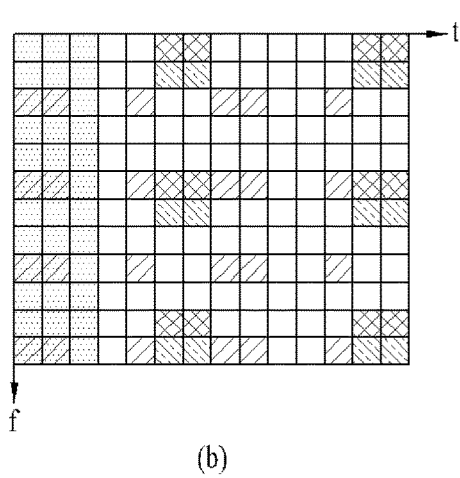

As shown in FIG. 7, depending upon the channel rank, there is a large difference in the number of REs for the PDSCH. Since the difference in the number of REs for PDSCH may different as much as 12 REs depending upon the channel rank, if the channel rank is not taken into consideration when calculating the CQI index (i.e., if the conventional CQI index calculation method is applied), this may lead to a disadvantageous result, such as a waste of resource, an increase in error rate caused by a lack of resource, and so on. Therefore, by using the value $N_{RE}$ considering channel rank, when calculating the CQI, unnecessary waste of resource may be prevented and a CQI index best fitting the transmission scheme may be fed-back.

Also, although it was assumed in the above-described example that, in case of Ranks 1 and 2, the DMRS overhead is 12 REs/RB/port, and, in case of Ranks 3 to 8, the DMRS overhead is 24 REs/RB/port, the present invention will not be limited only to the example given herein. The present invention, for example, just as in the above-described full CDM method, in case of Ranks 1 to 4, the DMRS overhead may be 12 REs/RB/port, and, in case of Ranks 5 to 8, the DMRS overhead may be 24 REs/RB/port. And, even in this case, the best CQI index may be calculated in accordance with the same principle. In other words, according to the present invention, with respect to all of the cases wherein the number of REs (e.g., $N_{RE}$) having the PDSCH allocated thereto varies, an optimal CQI index may be calculated and fed-back.

Alternatively, instead of applying a method having the DMRS overhead taken into consideration for each rank, regardless of the rank, a maximum DMRS overhead (i.e., 24 REs/RB/port) may be considered so as to calculate the optimal CQI index. Furthermore, in this case, the complexity in the CQI calculation may also be simplified.

Wireless Communication System Supporting a Relay Node

Figure 14:
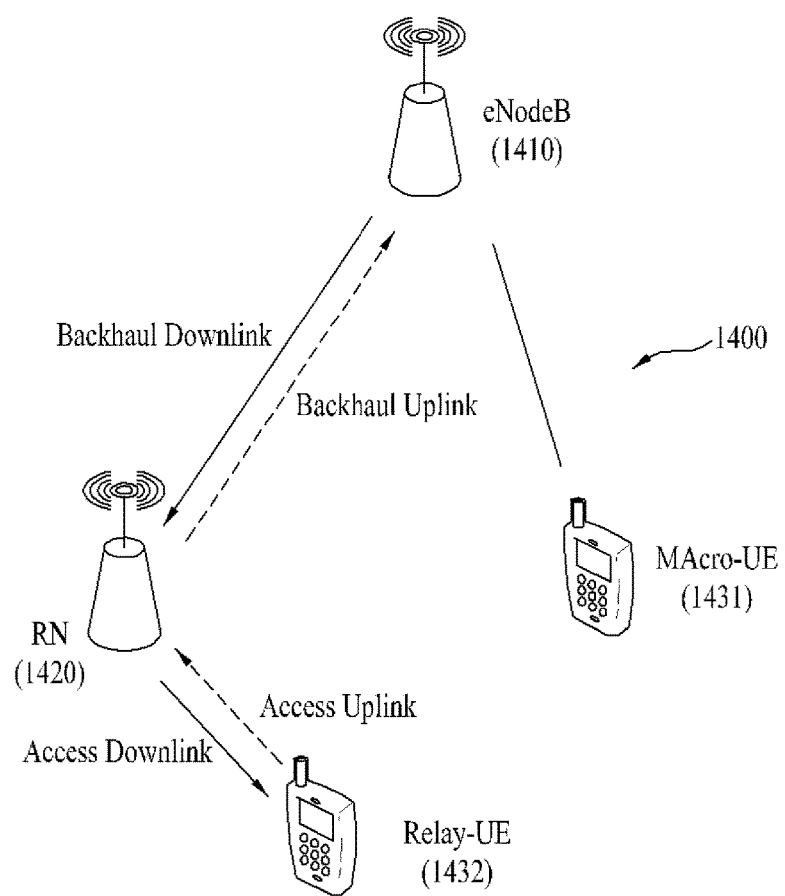
FIG. 14 illustrates a wireless communication system including a relay.

Referring to FIG. 14, a relay node (1420) performs the role of forwarding a transmission/reception between a base station (1410) and a user equipment (1431). Herein, a link between the base station (1410) and the relay node (1420) is referred to as a Back-haul link, and the link between the relay node (1420) and the user equipment(s) (1431) is referred to as an access link. An uplink receiving function and a downlink transmitting function are required in the base station, and an uplink transmitting function and a downlink receiving function are required in the user equipment(s). Meanwhile, a function of performing Back-haul uplink transmission to the base station, a function of performing access uplink reception from the user equipment, a function of performing Back-haul downlink reception from the base station, and a function of performing access downlink transmission to the user equipment are all required in the relay node.

Meanwhile, the case wherein the Back-haul link is operated in the same frequency band as the access link is referred to as an 'in-band', and the case wherein the Back-haul link and the access link are each operated in a different frequency band is referred to as an 'out-band'. In case of an in-band relay node, for example, when a back-haul downlink reception from the base station and an access downlink transmission are performed at the same time in a predetermined frequency band, a transmitted signal from the transmitting end of the relay node may be received by the receiving end of the relay node. And, accordingly, a signal interference or RF jamming may occur at the RF front-end of the relay node. Similarly, when an access uplink reception from the user equipment and a back-haul uplink transmission to the base station is performed at the same time in a predetermined frequency band, signal interference may occur at the RS front-end of the relay node. In order to prevent such signal interference from occurring, the relay node may be configured that transmission and reception are not performed simultaneously within the same frequency band. For example, a TDM (Time Division Multiplexing) may be used between the Back-haul downlink reception and the access downlink transmission, so that a Back-haul downlink can be received by the relay node during a predetermined time period in a predetermined frequency band, and also so that an access downlink can be transmitted by the relay node during another time period. Similarly, a TDM may also be used between the Back-haul uplink transmission and the access uplink reception. Herein, the relay node that is operated as described above may also be referred to as a half-duplex relay node. In this case, a Guard Time for switching the transmitting/receiving operations of the relay node is required to be set-up. For example, in order to perform switching between a Back-haul downlink reception and an access downlink transmission, a Guard Time may be set-up within a subframe receiving the back-haul downlink.

In a general embodiment of the relay node, within the same frequency carrier (i.e., within the same IFFT/FFT region) an access link and a back-haul link may be partitioned into subframe units each having the length of 1 ms by using the TDM method. Herein, the connection with user equipments (hereinafter referred to as 'legacy user equipments (legacy-UEs)') operating in accordance with a wireless communication system wherein the relay node is not applied thereto (e.g., the conventional LTE Release-8 or 9 system), is required to be supported. In other words, backward-compatibility is required to be supported. At this point, the relay node is required to support a measuring function of the legacy user equipments within its own region. Therefore, even in a subframe that is set-up for the back-haul downlink reception, in a section corresponding to the first N (N=1, 2, or 3) number of OFDM symbols within the subframe, the relay node is required to perform an access downlink transmission instead of receiving the Back-haul downlink.

Figure 15:
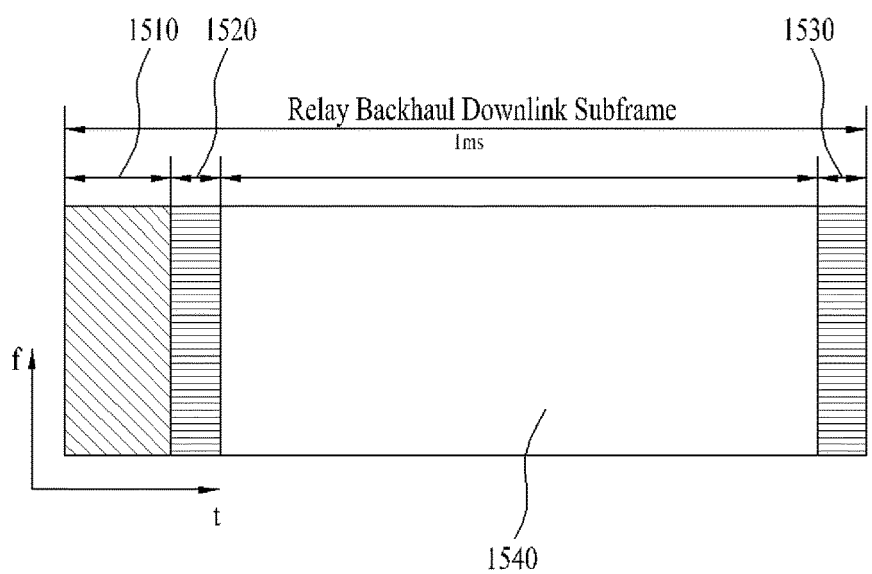
FIG. 15 illustrates an example of a Back-haul downlink sub-frame structure.

FIG. 15 illustrates an exemplary Back-haul downlink subframe structure.

In FIG. 15, a relay node non-hearing section (1510) refers to a section wherein the relay node transmits an access downlink signal without receiving a Back-haul downlink signal. As described above, this section (1510) may be set-up as 1, 2, or 3 OFDM lengths (the first 1 to 3 OFDM symbol of a Back-haul downlink subframe).

The guard time (1520) corresponds to a section enabling the relay node to switch the transmitting/receiving mode, and the guard time (1530) corresponds to a section enabling the relay node to switch the receiving/transmitting mode. The length of the guard time may be given as a value of the time domain, or the length of the guard time may be set-up with k number of time sample values with reference to a time sample (Ts) value. In some cases, the guard time may be set-up as the length of one or more OFDM symbols. For example, in case a relay node Back-haul downlink subframe is consecutively set-up, or in accordance with a predetermined subframe timing alignment relation, the guard time (1530) of the last portion of the subframe may not be defined or set-up.

In a relay node Back-haul downlink receiving section (1540), the relay node may receive the PDCCH and PDSCH for the relay node from the base station. As those physical channels are dedicated to the relay node, the received channels may also be expressed as an R-PDCCH (Relay-PDCCH) and an R-PDSCH (Relay-PDSCH).

Meanwhile, the DMRS pattern described in FIG. 6 may be applied to the relay node Back-haul downlink subframe only in a limited situation. More specifically, the DMRS pattern of a general subframe shown in FIG. 6 may be used only in the case wherein the relay node can receive the last OFDM symbol (the $14^{th}$ OFDM symbol in case of a normal CP) of the Back-haul downlink subframe. In case the last OFDM symbol of the relay node Back-haul downlink subframe is set-up as the guard time, the DMRS pattern shown in FIG. 6 cannot be applied to the relay node Back-haul downlink subframe.

Moreover, a Back-haul downlink transmission, which uses the DMRS for the demodulation of the R-PDCCH for the relay node, may be configured. More specifically, the R-PDDCH may be transmitted through a predetermined precoding based rank-1 transmission, spatial multiplexing or a transmit diversity scheme using the DMRS.

Figure 16:
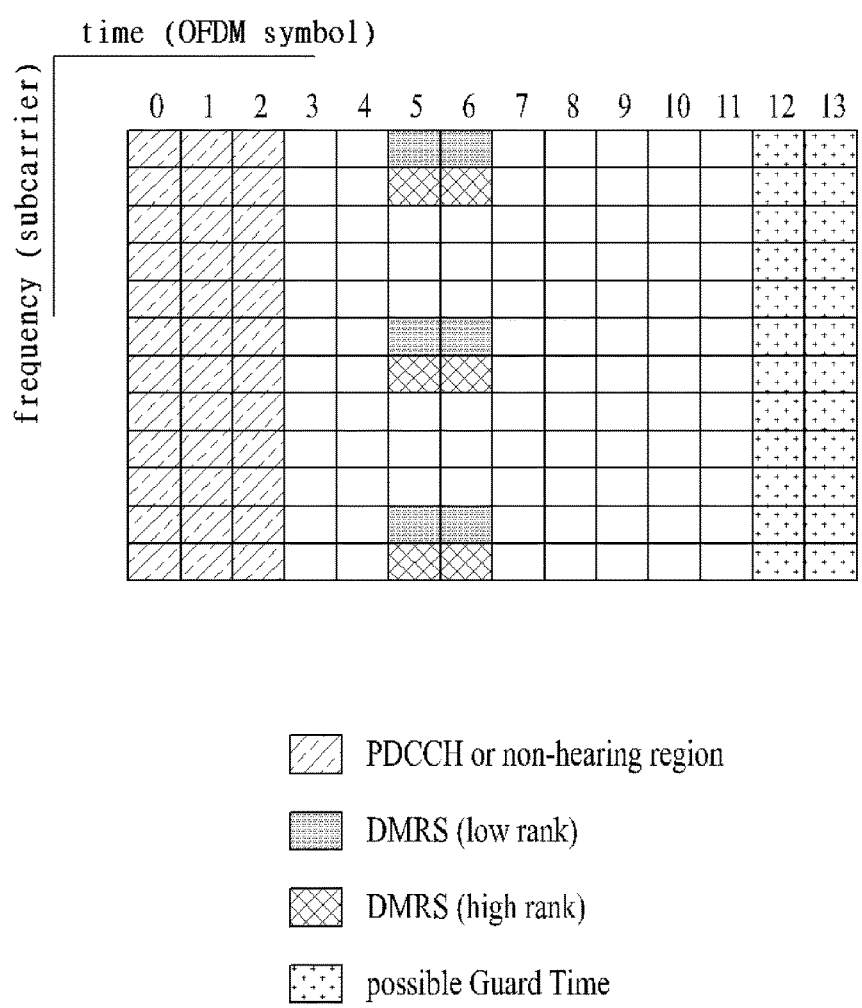
FIG. 16 illustrates an example of a DMRS pattern in a Back-haul downlink sub-frame structure.

Accordingly, a DMRS pattern may be newly designed for the relay node Back-haul link. More specifically, a new DMRS pattern that is different from the DMRS pattern described in FIG. 6 may be applied for the relay node Back-haul downlink transmission. For example, as shown in FIG. 16, considering the situation wherein one OFDM symbol or a certain number of OFDM symbols of the last portion of the downlink subframe in the DMRS pattern of FIG. 6 cannot be used for the Back-haul downlink transmission (a situation such as a guard time is set-up), a Back-haul downlink subframe DMRS pattern format excluding the DMRS REs of the second slot (i.e., DMRS REs being defined in the last two OFDM symbols within the downlink subframe) may be configured. Evidently, in case a guard time is not set-up in the relay node Back-haul downlink subframe, the same DMRS pattern as that of FIG. 6 may also be applied to the relay node Back-haul downlink.

Even in a case where the DMRS pattern as FIG. 16 is used, in accordance with the above-described principle of the present invention, a method of calculating and transmitting an optimal CQI index considering a change in the number of REs (i.e., $N_{RE}$) to which the PDSCH can be allocated, wherein the change in the number of REs is caused by a change in the DMRS overhead, may be applied. In this case, the relay node becomes of downlink reception entity, and the macro base station becomes the downlink transmission entity. Thus, a feedback on the CQI index, which is transmitted from relay node, may be received by the macro base station.

In the example of FIG. 16, it is assumed that 3 OFDMs are set-up as the PDCCH (or non-hearing section) within one resource block of the Back-haul downlink subframe, and that the R-PDCCH is not set-up, and that a total of 2 OFDM symbols are used as the guard time.

At this point, in case of a lower rank, the DMRS overhead is 6 REs/RB/port, and the number of REs that can be allocated to the data transmission is equal to 102. Meanwhile, in case of a higher rank, the DMRS overhead is 12 REs/RB/port, and the number of REs that can be allocated to the data transmission is equal to 96. As described above, depending upon the channel rank, there is a large difference is the number of REs for the R-PDSCH. Since the number of REs for the R-PDSCH may be different up to 6 REs depending upon the channel rank, if the rank is not taken into consideration in calculation of the CQI index (i.e., if the conventional CQI index calculation method is applied), this may lead to a disadvantageous result, such as a waste of resource, an increase in error rate caused by a lack of resource, and so on. Therefore, by using the value $N_{RE}$, wherein the channel rank is taken into consideration, when calculating the CQI, unnecessary waste of resource may be prevented, and a CQI index best fitting the transmission method may be fed-back.

According to the present invention, for all cases wherein the number of REs (i.e., $N_{RE}$) that are allocated to a (Back-haul) downlink data transmission varies in accordance with the channel rank, an optimal CQI index may be calculated and fed-back.

Alternatively, in the relay node Back-haul downlink, instead of applying a method having the DMRS overhead taken into consideration for each rank, regardless of the rank, a maximum DMRS overhead (i.e., 12 REs/RB/port) may be considered so as to calculate the optimal CQI index. Furthermore, in this case, the complexity in the CQI calculation may also be simplified.

Meanwhile, in case of an access downlink, identical methods for calculating and feeding-back a CQI index, which considers the DMRS overhead for a downlink between the above-described base station and user equipment (macro-UE), may be used between the relay node and the user equipment (relay-UE).

Figure 17:
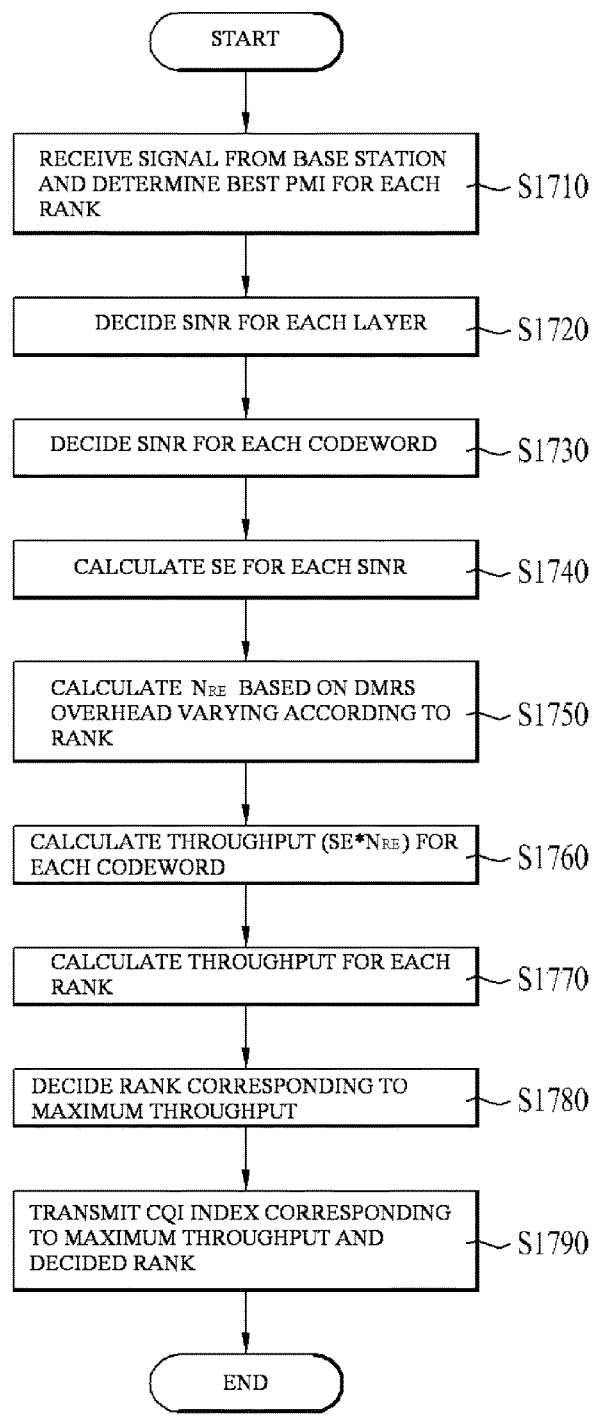
FIG. 17 illustrates a flow chart of a method for calculating and transmitting a CQI according to an embodiment of the present invention.

FIG. 17 illustrates a flow chart showing a method for calculating a CQI according to an embodiment of the present invention.

In step S1710, the user equipment may use a signal received from the base station and determine a best PMI for each rank.

In step S1720, the user equipment may decide an SINR for each layer through the decided PMI.

In step S1730, based upon the SINR decided for each layer, the user equipment may decide an SINR for each codeword. This may be decided in accordance with a codeword-to-layer mapping rule. Table 2 and Table 3 shown above correspond to a codeword-to-layer mapping rule when 4 transmitting antennae are used. Therefore, in case of an extended antenna configuration (e.g., 8 transmitting antennae configuration), the SINR for each codeword may be decided in accordance with the codeword-to-layer mapping rule, which is defined in accordance with the extended antenna configuration.

In step S1740, the user equipment may calculate a Spectral Efficiency (SE) best fitting each SINR for each codeword of a respective rank depending upon the user equipment capability.

In step 1750, the user equipment takes into consideration a DMRS overhead, which varies according to rank (in case of a general subframe, the DMRS overhead is 12 REs in a lower rank and 24 REs in a higher rank, and, in case a guard time is set up in the last symbol within the relay node Back-haul subframe, the DMRS overhead is 6 REs in a lower rank and 12 REs in a higher rank), thereby being capable of calculating the number of REs (i.e., $N_{RE}$) that can be allocated for data transmission (PDSCH or R-PDSCH). Also, in order to simplify the CQI calculation, the value $N_{RE}$ may be calculated by applying a maximum DMRS overhead (24 REs in case of a general subframe, and 12 REs in case of a relay node Back-haul subframe), regardless of the rank.

In step S1760, the user equipment may calculate a throughput for each codeword by multiplying the SE calculated in step S1740 by the value $N_{RE}$ calculated in step S1750.

In step S1770, the user equipment may calculate a throughput for each rank by adding the throughputs calculated for each codeword in accordance with rank.

In step S1780, the user equipment compares the throughput calculated for each rank and may decide a rank value corresponding to the largest throughput.

In step S1790, the user equipment may feedback the CQI index corresponding to the largest throughput and the corresponding rank to the base station. The CQI index corresponding to the largest throughput may be decided by comparing a throughput value obtained by multiplying an efficiency value predetermined for each CQI index by the $N_{RE}$ value, with a maximum available throughput in a current channel status calculated by the user equipment through process steps S1710 to S1780. Thereafter, the CQI index having the most similar value may be decided as the CQI index that is to be fed-back.

Figure 18:
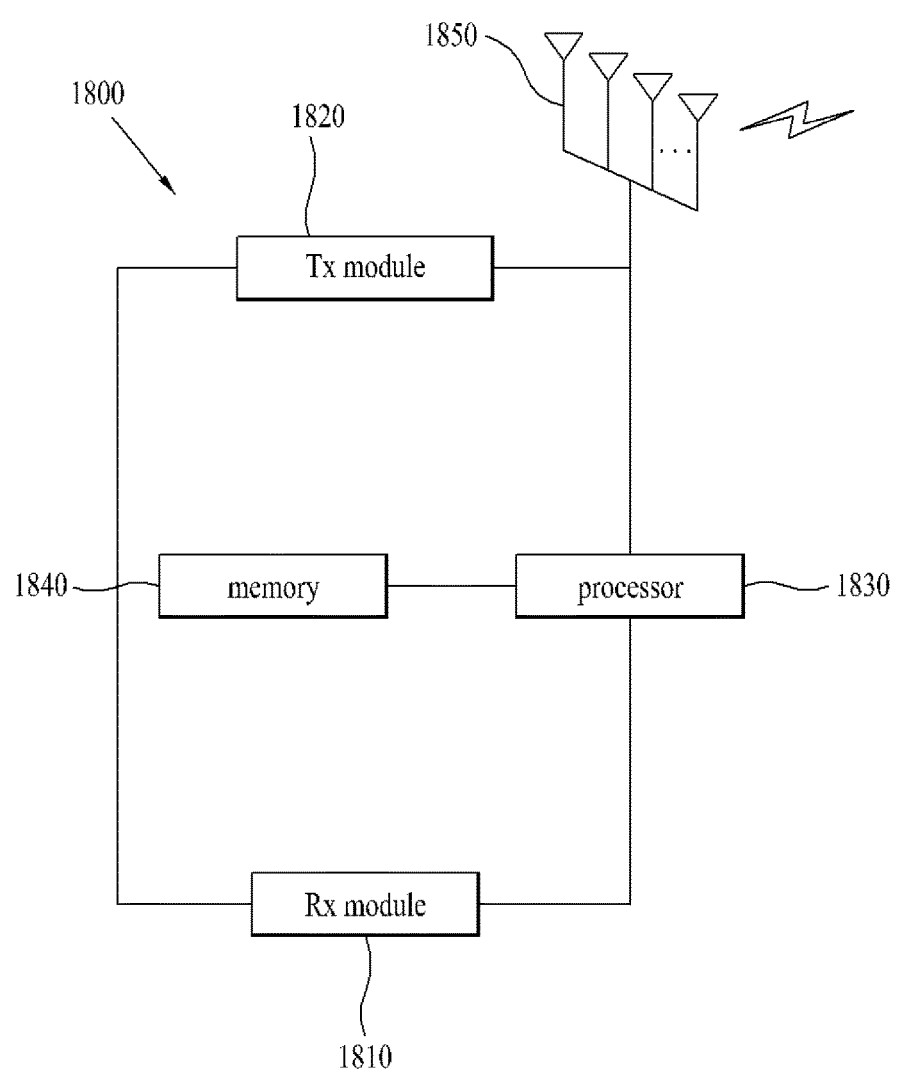
FIG. 18 illustrates a structure of a user equipment device, a relay station device, and a base station device according to a preferred embodiment of the present invention.

FIG. 18 illustrates structure of a user equipment device, a relay node device, or a base station device according to a preferred embodiment of the present invention. Although the same reference numerals are used for the user equipment device, the relay node device, or the base station device, this does not signify that each of the devices has the same structure. More specifically, following describes a separate structure of the user equipment device, the relay node device and the base station device.

The user equipment (UE) device 1800 may include a receiving module 1810, a transmitting module 1820, a processor 1830, and a memory 1840. The receiving module 1810 may receive various types of signals, data, and information from the base station. The transmitting module 1820 may transmit various types of signals, data, and information to the base station. The processor 1830 may be configured to control the overall operations of the user equipment device 1800, which includes the receiving module 1810, the transmitting module 1820, the processor 1830, the memory 1840, and an antenna 1850. Herein, the antenna 1850 may be configured of a plurality of antennae.

The processor 1830 of the user equipment device may be configured to calculate a channel quality information index for downlink signal received through the receiving module 1810, considering the number of resource elements (i.e., $N_{RE}$) for PDSCH transmission determined based upon an overhead of the DMRS. The processor 1830 of the user equipment device may further be configured to transmit the calculated channel quality information index through the transmitting module 1820.

The overhead of the DMRS within a resource block may be set to 12 resource elements in case of lower ranks (e.g., Ranks 1 and 2) and to 24 resource elements in case of higher ranks (e.g., Ranks 3 to 8). Alternatively, the overhead of the DMRS within a resource block may be set to 24 resource elements regardless of the downlink transmission rank.

Various embodiments of the present invention as described above may be identically applied to details on the user equipment device 1800 and, more particularly, details associated with a configuration realizing the operations of the processor 1830 of the user equipment device 1800 calculating the CQI information.

Additionally, the processor 1830 of the user equipment device may perform functions of operating and processing information received by the user equipment device, information that is to be transmitted outside the system, and so on. Furthermore, the memory 1840 may store the operated and processed information for a predetermined period of time. Herein, the memory 1840 may also be replaced by other components such as a buffer (not shown).

Meanwhile, the relay node (RN) device 1800 may include a receiving module 1810, a transmitting module 1820, a processor 1830, and a memory 1840. The receiving module 1810 may receive various types of signals, data, and information within a Back-haul downlink from the base station, and the receiving module 1810 may also receive various types of signals, data, and information within an access uplink from the user equipment. The transmitting module 1820 may transmit various types of signals, data, and information within a Back-haul downlink to the base station, and the transmitting module 1820 may also transmit various types of signals, data, and information within an access uplink to the user equipment. The processor 1830 may be configured to control the overall operations of the user equipment device 1800, which includes the receiving module 1810, the transmitting module 1820, the processor 1830, the memory 1840, and an antenna 1850. Herein, the antenna 1850 may be configured of a plurality of antennae.

The processor 1830 of the relay node device may be configured to calculate a channel quality information index for Back-haul downlink signal received through the receiving module 1810, considering the number of resource elements for R-PDSCH transmission determined based upon an overhead of the DMRS. The processor 1830 of the relay node device may be further configured to transmit the calculated channel quality information index to the base station through the transmitting module 1820.

The overhead of the DMRS within one resource block may be set to 6 resource elements in case of lower ranks (e.g., Ranks 1 and 2), and to 12 resource elements in case of higher ranks (e.g., Ranks 3 to 8). Alternatively, the overhead of the DMRS within a resource block may also be set to 12 resource elements regardless of the Back-haul downlink transmission rank.

Various embodiments of the present invention as described above may be identically applied to details on the relay node device 1800 and, more particularly, details associated with a configuration realizing the operations of the processor 1830 of the relay node device 1800 calculating the CQI information.

Additionally, the processor 1830 of the relay node device may perform functions of operating and processing information received by the relay node device, information that is to be transmitted outside the system, and so on. Furthermore, the memory 1840 may store the operated and processed information for a predetermined period of time. Herein, the memory 1840 may also be replaced by other components such as a buffer (not shown).

Meanwhile, the base station (eNB) device 1800 may include a receiving module 1810, a transmitting module 1820, a processor 1830, a memory 1840, and an antenna 1850. The receiving module 1810 may receive various types of signals, data, and information from the user equipment. The transmitting module 1820 may transmit various types of signals, data, and information to the user equipment. The processor 1830 may be configured to control the overall operations of the user equipment device 1800, which includes the receiving module 1810, the transmitting module 1820, the processor 1830, the memory 1840, and an antenna 1850. Herein, the antenna 1850 may be configured of a plurality of antennae.

The processor 1830 of the base station device may be configured to receive a channel quality information index for a downlink signal transmitted through the transmitting module 1820. The channel quality information index may be calculated at a downlink reception entity (user equipment or relay node) considering the number of resource elements for a PDSCH (or R-PDSCH) transmission determined based upon an overhead of the DMRS. The processor 1830 of the base station device may be further configured to transmit the downlink signal through the transmitting module 1820 considering the channel quality information index.

Various embodiments of the present invention as described above may be identically applied to details on the base station device 1800 and, more particularly, details associated with a configuration realizing the operations of the processor 1830 of the base station device 1800 receiving the CQI information and performing downlink transmission.

Additionally, the processor 1830 of the base station device may perform functions of operating and processing information received by the base station device, information that is to be transmitted outside the system, and so on. Furthermore, the memory 1840 may store the operated and processed information for a predetermined period of time. Herein, the memory 1840 may also be replaced by other components such as a buffer (not shown).

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

Although the description of the above-described embodiments of the present invention is focused mainly on a 3GPP LTE group system, the present invention will not be limited only to the exemplary assumption made in the description of the present invention. Herein, the embodiments of the present invention may be used and applied in various types of mobile communication systems having the MIMO technique applied thereto, by using the same method.

What is claimed is:

1. A method for transmitting a channel quality indicator (CQI) to a base station (BS), the method comprising:
   receiving, by a user equipment (UE), configuration information related to periodic channel state information (CSI) reporting via higher layer signaling;
   determining, by the UE, a CQI index based on the configuration information related to the periodic CSI reporting; and
   transmitting the determined CQI index to the BS,
   wherein the CQI index is determined based on both of a number of physical downlink shared channel (PDSCH) resource elements and an assumption that no resource element is allocated for a CSI-reference signal (CSI-RS).

2. The method of claim 1,
   wherein the number of the PDSCH resource elements is determined based on a UE-specific reference signal overhead,
   wherein the UE-specific reference signal overhead is determined according to a rank value,
   wherein the UE-specific reference signal overhead within one resource block for one subframe is 12 resource elements for the rank value of 1 or 2, and
   wherein the UE-specific reference signal overhead within one resource block for one subframe is 24 resource elements for the rank value of 3, 4, 5, 6, 7 or 8.

3. The method of claim 1, wherein the UE is configured for reporting at least one of a Precoding Matrix Indicator (PMI) or a Rank Indicator (RI).

4. The method of claim 1, wherein the configuration information related to the periodic CSI reporting includes a transmission period of the periodic CSI reporting and an offset for the transmission period in subframe units.

5. The method of claim 1, wherein the determined CQI index is transmitted to the BS on a Physical Uplink Control Channel (PUCCH).

6. A user equipment (UE) for transmitting a channel quality indicator (CQI) to a base station (BS), the UE comprising:
   a receiver configured to receive a downlink signal from the BS;
   a transmitter configured to transmit an uplink signal to the BS;
   a processor configured to be connected to the receiver and transmitter and to control operations of the UE,
   wherein the processor is further configured to:
   control the receiver to receive configuration information related to periodic channel state information (CSI) reporting via higher layer signaling,
   determine a CQI index based on the configuration information related to the periodic CSI reporting, and
   control the transmitter to transmit the determined CQI index, and
   wherein the CQI index is determined based on both of a number of physical downlink shared channel (PDSCH) resource elements and an assumption that no resource element is allocated for a CSI-reference signal (CSI-RS).

7. The UE of claim 6, wherein the number of the PDSCH resource elements is determined based on a UE-specific reference signal overhead,
   wherein the UE-specific reference signal overhead is determined according to a rank value,
   wherein the UE-specific reference signal overhead within one resource block for one subframe is 12 resource elements for the rank value of 1 or 2, and
   wherein the UE-specific reference signal overhead within one resource block for one subframe is 24 resource elements for the rank value of 3, 4, 5, 6, 7 or 8.

8. The UE of claim 6, wherein the UE is configured for reporting at least one of a Precoding Matrix Indicator (PMI) or a Rank Indicator (RI).

9. The UE of claim 6, wherein the configuration information related to the periodic CSI reporting includes a transmission period of the periodic CSI reporting and an offset for the transmission period in subframe units.

10. The UE of claim 6, wherein the determined CQI index is transmitted to the BS on a Physical Uplink Control Channel (PUCCH).

11. A method for receiving a channel quality indicator (CQI) from a user equipment (UE), the method comprising:
   transmitting, by a base station (BS) to the UE, configuration information related to periodic channel state information (CSI) reporting via higher layer signaling; and
   receiving, by the BS, a CQI index,
   wherein the CQI index is determined by the UE based on considering the configuration information related to the periodic CSI reporting, and
   wherein the CQI index is determined based on both of a number of physical downlink shared channel (PDSCH) resource elements and an assumption that no resource element is allocated for a CSI-reference signal (CSI-RS).

12. A base station (BS) for receiving a channel quality indicator (CQI) from a user equipment (UE), the BS comprising:
   a receiver configured to receive an uplink signal from the UE;
   a transmitter configured to transmit a downlink signal to the UE; and
   a processor configured to be connected to the receiver and the transmitter so as to control operations of the BS,
   wherein the processor is further configured to:
   control the transmitter to transmit, to the UE, configuration information related to periodic channel state information (CSI) reporting via higher layer signaling, and
   control the receiver to receive a CQI index,
   wherein the CQI index is determined by the UE based on the configuration information related to the periodic CSI reporting, and
   wherein the CQI index is determined based on both of a number of physical downlink shared channel (PDSCH) resource elements and an assumption that no resource element is allocated for a CSI-reference signal (CSI-RS).

* * * * *